(12) United States Patent
Roberts

(10) Patent No.: US 7,746,325 B2
(45) Date of Patent: Jun. 29, 2010

(54) METHOD FOR IMPROVING POSITIONED ACCURACY FOR A DETERMINED TOUCH INPUT

(75) Inventor: Jerry B. Roberts, Arlington, MA (US)

(73) Assignee: 3M Innovative Properties Company, Saint Paul, MN (US)

(*) Notice: Subject to any disclaimer, the term of this patent is extended or adjusted under 35 U.S.C. 154(b) by 2283 days.

(21) Appl. No.: 10/140,209

(22) Filed: May 6, 2002

(65) Prior Publication Data

US 2003/0206162 A1 Nov. 6, 2003

(51) Int. Cl.
*G06F 3/041* (2006.01)
(52) U.S. Cl. ...................................... 345/173
(58) Field of Classification Search ......... 345/173–179; 178/18.1–18.5, 19.1–19.5; 340/712
See application file for complete search history.

(56) References Cited

U.S. PATENT DOCUMENTS

| | | | |
|---|---|---|---|
| 3,657,475 A | 4/1972 | Peronneau et al. | |
| 4,089,036 A | 5/1978 | Geronime | |
| 4,121,049 A | 10/1978 | Roeber | |
| 4,340,777 A | 7/1982 | DeCosta et al. | |
| 4,355,202 A | 10/1982 | DeCosta et al. | |
| 4,389,711 A | 6/1983 | Hotta et al. | |
| 4,484,179 A | 11/1984 | Kasday | |
| 4,495,434 A | 1/1985 | Diepers et al. | |
| 4,511,760 A | 4/1985 | Garwin et al. | |
| 4,542,375 A | 9/1985 | Alles et al. | |
| 4,550,384 A | 10/1985 | Kimura | |
| 4,558,757 A | 12/1985 | Mori et al. | |
| 4,675,569 A | 6/1987 | Bowman et al. | |
| 4,697,049 A | 9/1987 | Peemoller et al. | |
| 4,745,565 A | 5/1988 | Garwin et al. | |
| 4,771,277 A | 9/1988 | Barbee et al. | |
| 4,775,765 A | 10/1988 | Kimura et al. | |
| 4,816,811 A | 3/1989 | Bogatin et al. | |
| 4,875,378 A | 10/1989 | Yamazaki et al. | |
| 4,893,115 A | 1/1990 | Blanchard | |
| 4,918,262 A | 4/1990 | Flowers et al. | |

(Continued)

FOREIGN PATENT DOCUMENTS

EP    0 531 815    3/1993

(Continued)

OTHER PUBLICATIONS

"Force Concentrator For Touch Sensitive Panel Using Snap-Action Switches", IBM Technical Disclosure Bulleting #NN7606238, vol. 19, Jun. 1976.

(Continued)

*Primary Examiner*—Srilakshmi K Kumar
(74) *Attorney, Agent, or Firm*—Steven A. Bern

(57) ABSTRACT

An approach for accurately determining touch location on a touch screen is provided. According to one aspect, a touch signal shape may be correlated with a level of touch-induced touch signal error present in the touch signal. The touch signal shape is associated with a preferred time for obtaining touch signal information to determine the touch location. Touch signal location information is acquired in response to detecting the touch signal shape in the touch signal. The location of the touch is determined from the acquired touch signal information.

76 Claims, 16 Drawing Sheets

U.S. PATENT DOCUMENTS

| | | | |
|---|---|---|---|
| 4,983,787 A | | 1/1991 | Kunikane |
| 5,038,142 A | | 8/1991 | Flower et al. |
| 5,053,757 A | * | 10/1991 | Meadows .................. 345/173 |
| 5,060,066 A | | 10/1991 | Roberts |
| 5,072,076 A | | 12/1991 | Camp, Jr. |
| 5,241,308 A | | 8/1993 | Young |
| 5,376,948 A | | 12/1994 | Roberts |
| 5,541,372 A | | 7/1996 | Baller et al. |
| 5,543,588 A | | 8/1996 | Bisset et al. |
| 5,543,591 A | | 8/1996 | Gillespie et al. |
| 5,563,632 A | | 10/1996 | Roberts |
| 5,708,460 A | | 1/1998 | Young et al. |
| 5,714,694 A | | 2/1998 | Diessner |
| 5,854,625 A | | 12/1998 | Frisch et al. |
| 5,943,043 A | | 8/1999 | Furuhata et al. |
| 6,108,211 A | | 8/2000 | Diessner |
| 6,137,474 A | | 10/2000 | Komatsu |
| 6,271,836 B1 | * | 8/2001 | Makinwa .................. 345/173 |
| 6,285,358 B1 | | 9/2001 | Roberts |
| 2002/0039092 A1 | | 4/2002 | Shigetaka |

FOREIGN PATENT DOCUMENTS

JP           61148522      12/1984

OTHER PUBLICATIONS

"Touch-Sensitive Pancake", IBM Technical Disclosure Bulleting #88A61790, Oct. 1998.

U.S. Appl. No. 09/835,049, filed Apr. 13, 2001, "Tagential Force Control In a Touch Location Device".

U.S. Appl. No. 09/835,040, filed Apr. 13, 2001, "Method and Apparatus For Force-Based Touch Input".

U.S. Appl. No. 10/121,516, filed Apr. 12, 2002, "Touch Screen with Rotationally Isolated Force Sense".

U.S. Appl. No. 10/121,507, filed Apr. 12, 2002, "Force Sensors and Touch Panels Using Same".

U.S. Appl. No. 10/142,118, filed May 8, 2002, "Baselining Techniques in Force-based Touch Panel Systems".

U.S. Appl. No. 10/150,704, filed May 17, 2002, "Correction of Memory Effect Errors in Force-based Touch Panel Systems".

U.S. Appl. No. 10/147,604, filed May 17, 2002, "Calibration of Force Based Touch Panel Systems".

* cited by examiner

METHOD FOR IMPROVING POSITIONED ACCURACY FOR A DETERMINED TOUCH INPUT

FIELD OF THE INVENTION

The present invention is directed generally to a touch sensor, and more particularly to a method and system for determining the location of a touch on a touch screen.

BACKGROUND

A touch screen offers a simple, intuitive interface to a computer or other data processing device. Rather than using a keyboard to type in data, a user can transfer information through a touch screen by touching an icon or by writing or drawing on a screen. Touch screens are used in a variety of information processing applications. Transparent touch screens are particularly useful for applications such as cell phones, personal data assistants (PDAs), and handheld or laptop computers.

Various methods have been used to determine touch location, including capacitive, resistive, acoustic and infrared techniques. Touch location may also be determined by sensing the force of the touch through force sensors coupled to a touch surface. Touch screens that operate by sensing touch force have several advantages over other technologies mentioned above. First, force sensors do not require the touch surface to be composed of special materials that may inhibit optical transmission through the touch surface, as in a resistive touch sensor. Further, force sensors do not rely on a lossy electrical connection to ground, as is required by a capacitive touch screen, and can be operated by a finger touch, gloved hand, fingernail or other nonconductive touch instrument. Unlike surface acoustic wave technology, force sensors are relatively immune to accumulations of dirt, dust, or liquids on the touch surface. Finally, a force sensor is less likely to detect a close encounter with the touch surface as an actual touch, which is a common problem with infrared touch screens.

Force based touch screens are potentially prone to errors in reported touch location from a number of sources. A force responsive touch signal produced by touch screen force sensors may be affected by a variety of static and dynamic factors in addition to the touch force. These factors may be considered noise sources with respect to the touch signal. Noise may be introduced through the touch screen electronics, or it may be mechanical in nature. Electrical noise may be introduced, for example, in the touch sensing, amplification, data conversion or signal processing stages. Mechanical noise may arise from torsion of the touch screen, movement of the touch screen device, vibration of the touch screen, and other transient factors. The touch screen force sensors may be affected by the weight of the touch surface and preloading forces applied to the force sensors during manufacture. In addition, noise may be introduced by the touch itself.

The touch force typically changes rapidly throughout the duration of a touch. A touch in a single location produces a touch force signal that increases in magnitude as the touch is applied and then decreases in magnitude as the touch is removed. The touch may also be moved across the surface of the touch screen, generating a changing signal at each force sensor. Accurate determination of the touch location requires analysis of touch force signals generated by the touch force, as well as elimination of the static and dynamic noise signals affecting the touch screen.

SUMMARY OF THE INVENTION

In general terms, the present invention relates to a method and system for detecting the location of a touch on a touch sensor. Features of the present invention are particularly useful when combined with a microprocessor-based system operating a display device enhanced by a transparent touch screen.

In accordance with one embodiment of the present invention, a method for determining a touch location on a touch screen involves acquiring a touch signal corresponding to a touch on the touch screen, detecting a first occurrence of a touch signal shape in the touch signal, and determining touch location using touch signal information obtained in response to detecting the touch signal shape.

Another embodiment of the present invention includes associating a touch signal shape with a level of touch signal error. A touch signal corresponding to a touch on the touch screen is acquired. A first occurrence of the touch signal shape in the touch signal is detected. The touch location is determined using touch signal information obtained in response to detecting the touch signal shape.

A further embodiment of the invention involves associating a touch signal shape with a local minimum in touch-induced error present in the touch signal. A touch signal is acquired and a particular time at which the touch signal shape is present in the touch signal is determined. The touch location is determined using touch signal information obtained at the particular time.

In accordance with another embodiment of the invention, a method for determining a touch location on a touch screen includes acquiring a touch signal arising from a touch force on a touch screen and detecting a touch signal shape within an interval of the touch signal associated with maximum touch force. The touch location is determined using touch signal information obtained in response to detecting the touch signal shape.

Another approach of the present invention includes acquiring a touch signal representative of a touch on the touch screen, the touch signal having an error related to the rate of change of the touch signal. A particular time is detected for obtaining touch signal information to determine touch location based on the rate of change of the touch signal. Touch location is determined using the touch signal information obtained at the particular time.

Another embodiment of the invention, a touch screen system includes a touch surface and a plurality of touch sensors physically coupled to the touch surface. Each of the touch sensors produces a sensor signal in response to a touch applied to the touch surface. A control system, coupled to the touch sensors, receives sensor signals and acquires a touch signal from the sensor signals corresponding to a touch on the touch screen, detects a first occurrence of a touch signal shape in the touch signal, and determines touch location using touch signal information obtained in response to detecting the touch signal shape.

Another embodiment of the invention is directed to a touch screen display system. In this embodiment, a touch screen display system includes a touch surface and a plurality of touch sensors physically coupled to the touch surface. Each of the touch sensors produces a sensor signal in response to a touch applied to the touch surface. A control system, coupled to the touch sensors, receives sensor signals and acquires a touch signal from the sensor signals corresponding to a touch on the touch screen, detects a first occurrence of a touch signal shape in the touch signal, and determines touch location using touch signal information obtained in response to detecting the touch signal shape. The touch screen display system further includes a display for displaying information through the touch screen.

Another embodiment of the invention is directed to a display system including a touch screen system, a display for displaying information, and a processor coupled to the touch screen and the display for processing data displayed on the display and information received from the touch screen control system.

In accordance with a further embodiment of the invention, a system includes means for acquiring a touch signal corresponding to a touch on the touch screen, means for detecting a first occurrence of a touch signal shape in the touch signal, and means for determining touch location using touch signal information obtained in response to detecting the touch signal shape.

A further approach of the invention is directed to a system including means for associating a touch signal shape with a level of touch signal error, means for acquiring a touch signal corresponding to a touch on the touch screen, means for detecting a first occurrence of the touch signal shape in the touch signal, and means for determining touch location using touch signal information obtained in response to detecting the touch signal shape.

Yet another embodiment of the invention involves a system providing means for acquiring a touch signal arising from a touch force on a touch screen, means for detecting a touch signal shape within an interval of the touch signal associated with maximum touch force, and means for determining touch location using touch signal information obtained in response to detecting the touch signal shape.

In accordance with another embodiment of the invention, a computer-readable medium configured with executable instructions for causing one or more computers to perform a method determining touch location on a touch screen, the method including acquiring a touch signal corresponding to a touch on the touch screen, detecting a first occurrence of a touch signal shape in the touch signal, and determining touch location using touch signal information obtained in response to detecting the touch signal shape.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
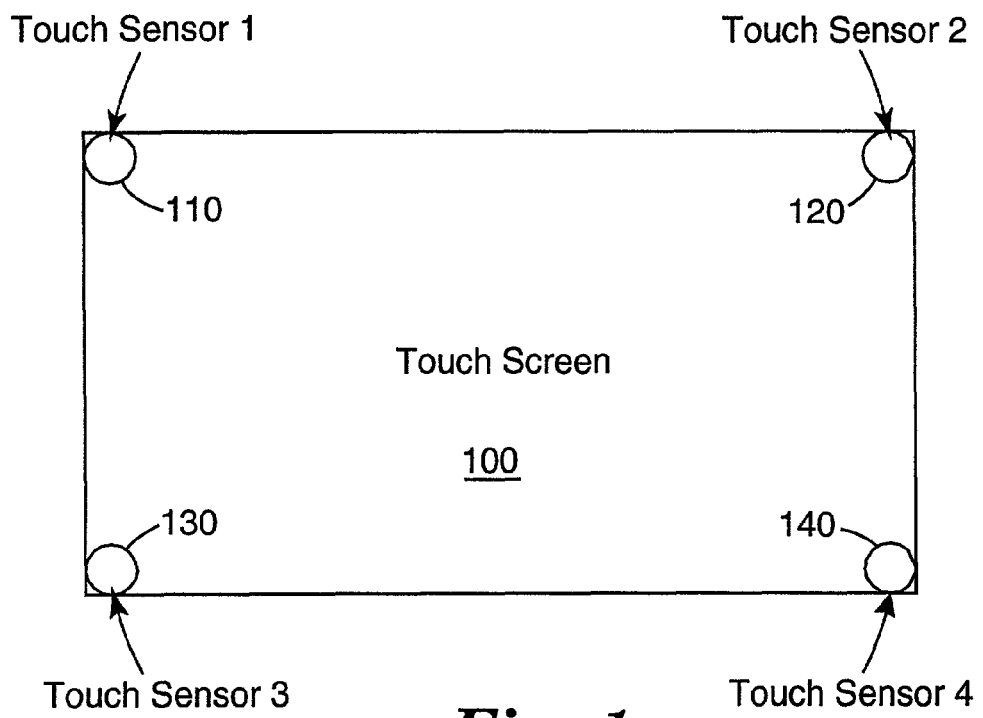
FIG. 1 schematically illustrates a top view of a touch screen with force sensors located at the corners of the touch screen in accordance with an embodiment of the invention.

The invention is amenable to various modifications and alternative forms. Specific embodiments of the invention have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following description of the illustrated embodiments, references are made to the accompanying drawings which form a part hereof, and various embodiments by which the invention may be practiced are shown by way of illustration. It is to be understood that other embodiments may be utilized, and structural and functional changes may be made without departing from the scope of the present invention.

As stated above, and for other reasons stated below which will become apparent upon reading the present specification, there is a need for a method and a system for accurately determining the location of a finger touch or an instrument touch on a touch surface. There exists a further need for such a method and system that calculates touch location with improved signal-to-noise ratio of the touch signal, and increases the accuracy of the touch location determination.

The present invention is applicable to touch sensing techniques and is believed to be particularly useful when features of the present invention are combined with a data processing system operating a display device enhanced by a transparent touch screen. For example, a touch screen of the present invention may be used in a desktop, handheld or laptop computer system, a point-of-sale terminal, personal data assistant (PDA), or a cell phone. Although described in combination with a microprocessor-based system, a touch screen device of the present invention may be combined with any logic-based system, if desired.

The present invention provides for the accurate determination of a touch location on a touch screen. A touch may be sensed by a number of touch sensors and represented by one or more touch signals. Accurate touch location determination involves measuring the magnitudes of one or more touch signals at a preferred time during a touch on a touch screen. The preferred time for making the touch location measurement may be ascertained by detecting a feature of a touch signal shape. The touch location measurement may be made at the preferred time in response to detection of the feature of the touch signal shape.

Conventional methods use a magnitude-based technique to measure the touch signal at the time the touch signal surpasses a fixed threshold magnitude. The threshold magnitude used in conventional methods is chosen to provide an acceptable signal-to-noise ratio, without regard to the level of touch-induced error present in the signal as it crosses at the particular threshold chosen. In contrast, a system and method of the present invention perform a touch location measurement at a particular time within the touch signal profile associated with lower touch signal error. Measurement of the touch signal at the particular time may result in higher signal to noise ratio due in large part to a decrease in touch signal error. The present system correlates the point of reduced touch signal error to a feature of the touch signal shape. Thus, the present system uses a shape-based approach for detecting the preferred time to make the touch location measurement. A touch signal shape may be characterized by as few as two points of the touch signal or by the entire set of points representing a touch signal. In one example, the slope of a touch signal is a touch signal shape that may be characterized by two points of the touch signal.

Touch signals representing the force of a touch acting on the touch screen are produced by one or more touch sensors coupled to a touch surface of the touch screen. A touch signal may be derived from a single sensor, or by combining sensor signals from two or more touch sensors. Determination of a touch location involves analyzing the sensor signals produced by the touch sensors. A tap touch in a single location characteristically produces a touch signal that increases in magnitude as the touch is applied and then decreases in magnitude as the touch is removed. A touch may be a continuing touch wherein the touch remains on the touch surface for a period of time. For example, the touch may be present in a single location for a period of time. Further, the touch may be a "streaming touch," wherein the touch is applied at one location, moved across the surface of the touch screen, and removed at another location, causing the generation of a continuously changing signal at each sensor.

A generalized diagram of a touch screen is illustrated in FIG. 1. A touch surface 100 is coupled to one or more touch sensors 110, 120, 130, 140. In the embodiment shown, the touch sensors 110, 120, 130, 140 are arranged at four corners of a rectangular touch surface. Although the touch screen illustrated in FIG. 1 is rectangular with sensors located at the corners, various configurations using three or more touch sensors with differing touch surface shapes may also be used.

Figure 2:
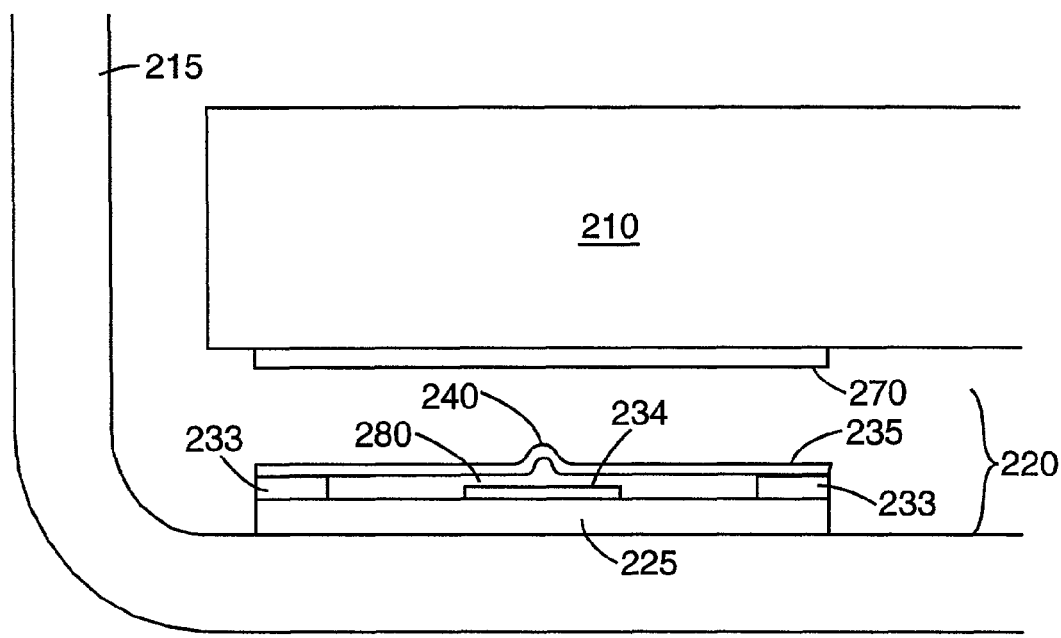
FIG. 2 schematically illustrates a cross-section view of a capacitive force sensor in accordance with an embodiment of the invention.

The sensors 110, 120, 130, 140, may be, for example, small capacitive force sensors constructed of two capacitor plates separated by a gap. A capacitive force sensor may be arranged so that when a touch force of sufficient magnitude and direction is applied to the touch surface, one capacitor plate deflects towards the second plate. The deflection alters the distance between the capacitor plates, changing the capacitance of the sensor. The touch force may be measured by control system circuitry as a change in an alternating electrical signal applied to the touch sensor. One embodiment of a capacitive force sensor appropriate for use in touch screen applications is described in U.S. Patent Application, U.S. Ser. No. 09/835,040, filed Apr. 13, 2001, entitled "Method and Apparatus for Force-Based Touch Input," which is incorporated herein by reference. The force sensor is appropriate for use with a liquid crystal display (LCD), cathode ray tube (CRT) or other transparent display, and is schematically illustrated in FIG. 2. In this particular embodiment, the sensor measures the applied force based on the change of capacitance of a capacitive element.

A touch surface 210, or overlay, is located within a structure or housing 215. The touch surface 210 is typically transparent to allow viewing of a display or other object through the touch surface. In other applications, the touch surface 210 can be opaque.

The structure or housing 215 may be provided with a large central aperture through which the display may be viewed. If desired, the undersurface of the housing 215 may be seated directly against the surface of such a display, over the border surrounding its active area. In another embodiment, as mentioned above, the overlay may be replaced by a structure including a display unit, such as an LCD.

A capacitive sensor 220 may be positioned between the touch surface 210 and the housing 215. An interconnect 225, with attachment lands 233, may be coupled to the housing 215 by soldering, cementing, or by other methods. A conductive area forms a first conductive element 234 on the interconnect 225. A second conductive element 235 with a central protrusion 240, for example a dimple, may be attached to the lands 233 of the interconnect 225 by soldering, for example. A small gap 280 is formed between the first conductive element 234 and the second conductive element 235, either by the shape of the second conductive element 235, or by the process of attaching the second conductive element 235 to the interconnect 225. The width of the gap 280 may be approximately 1 mil, for example. A capacitor is formed by the conductive elements 234, 235 separated by the gap 280.

An optional bearing surface 270 may be interposed between the touch surface 210 and the second conductive element 235. This may protect the touch surface 210 from indentation or from damage by the protrusion 240, especially in cases where the overlay is made of softer material. The bearing surface 270 may also mount to the touch surface 210 through a thin layer (not shown) of elastomer or of highly pliable adhesive, thereby providing a lateral softening function. It will be appreciated that, in normal operation, the touch surface 210 or bearing surface 270 is in contact with the protrusion 240: these elements are shown separated only for clarity in the illustration.

The second conductive element 235 combines the functions of a spring and a capacitor plate. As a perpendicular force is applied to the touch surface 210, the second conductive element 235 flexes, decreasing the width of the gap 280 and increasing the capacitance of the sensor 220. This change in capacitance may be measured and related to the force applied to the touch surface 210. Although a touch screen using capacitive force sensors is described, other types of force sensors may be used in a similar manner, including, for example, piezoelectric sensors and strain gauge sensors.

One of the advantages of a force-based touch screen is that the number of optically distinct layers positioned between the display unit and the user is low. Typically, the overlay positioned over the display unit is a single layer of glass or relatively stiff polymer, for example polycarbonate or the like, which may be chosen for suitable optical qualities. This contrasts with other types of touch screen, such as resistive or capacitive touch screens, that require several, potentially optically lossy, layers over the display unit. The electrically conductive thin films required in resistive or capacitive touch screens typically have a high index of refraction, leading to increased reflective losses at the interface. This is a particular problem in resistive screens where there are additional solid/air interfaces and where antireflection coatings are not useful, since the conductive layers must be able to make physical contact. A screen overlay for a force-based touch screen, however, has only its upper and lower surfaces; these may be treated to reduce reflective losses and to reduce glare. For example, the overlay may be provided with matte surfaces to reduce specular reflection, and/or may be provided with anti-reflection coatings to reduce reflective losses.

Figure 3:
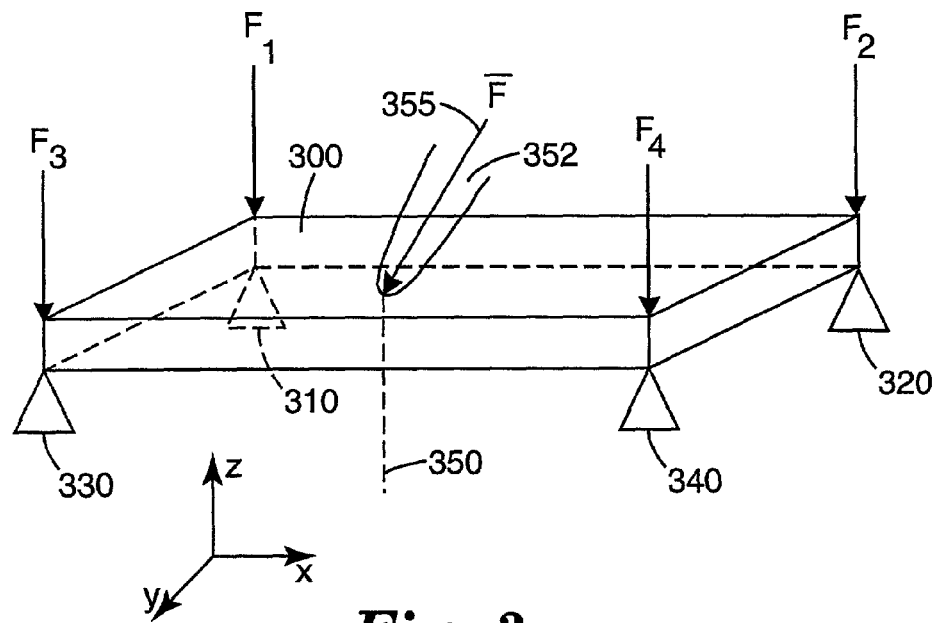
FIG. 3 schematically illustrates a perspective view of a touch screen with force sensors located at the corners of the touch screen in accordance with an embodiment of the invention.

A perspective view of a touch screen is schematically illustrated in FIG. 3. A touch surface 300 is shown disposed proximate to force sensors 310, 320, 330, 340 located at respective corners of the touch surface 300. As a stylus, finger or other touching device 352 presses the touch surface 300, a touch force 355 is exerted upon the touch surface 300 at the touch location 350. The touch force 355 creates forces F1, F2, F3, F4 on the force sensors 310, 320, 330, 340 perpendicular to the touch surface 300. The force sensors 310, 320, 330, 340 may be driven with an alternating electrical signal. The perpendicular forces F1, F2, F3, F4 cause a change in the capacitance of the force sensors 310, 320, 330, 340, thereby causing the signal coupled through the force sensors 310, 320, 330, 340 to change. The force responsive signals derived from the force sensors 310, 320, 330, 340 may be used to calculate touch location.

Calculation of the touch location may be performed, for example, using combinations of the force responsive touch sensor signals. The force responsive signals generated by the touch sensors may be used to calculate various touch signals, including the moment about the y-axis, $M_y$, moment about the x-axis, $M_x$, and the total z-direction force, $F_{Tz}$. The coordinates of the touch location may be determined from the touch sensor signals, as provided in Equation 1, assuming a reference point in the center of the touch screen, ideal conditions, with no errors, background fluctuations or disturbances present other than the touch force.

$$X = \frac{M_y}{F_{T_z}}$$

$$Y = \frac{M_x}{F_{T_z}}$$

[1]

where $$M_x = (F1+F2)-(F3+F4);$$

$$M_y = (F2+F4)-(F1+F3); \text{ and}$$

$$F_{Tz} = F1+F2+F3+F4.$$

Figure 4:
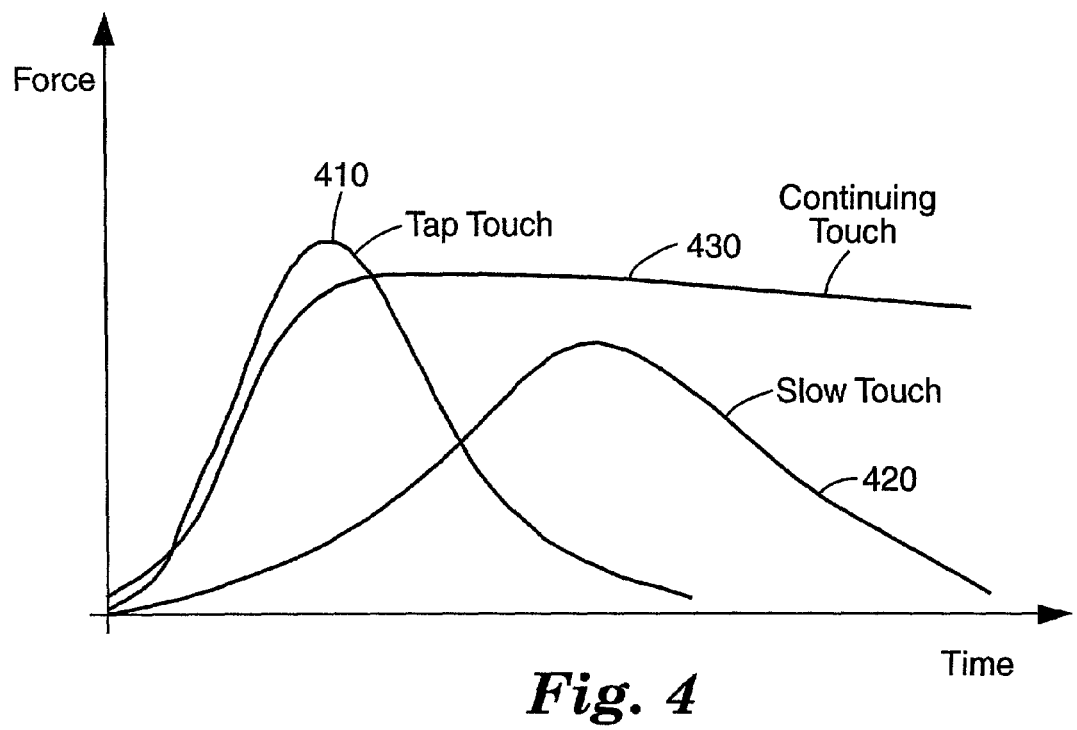
FIG. 4 illustrates the magnitude of force with respect to time of various touch types.

Exemplary waveforms representing various profiles of a touch signal, such as the total z-direction force, $F_{Tz}$, are illustrated in FIG. 4 for various touch types. Although the touch signal profiles of the total force, $F_{Tz}$, are illustrated, other combinations of the sensor signals produce similar profiles.

The shape of the touch signal profiles for various touch types may vary significantly depending on the type of touch. The profile of a tap touch 410 has relatively short rise and fall times and may occupy a relatively short time interval, for example approximately 15 msec. The profile of a soft touch 420 may exhibit a slower rise time and longer duration. However, the relative magnitudes of the touch signals may be unpredictable. A continuing touch signal may represent a touch lingering in one location on the touch screen, or may represent a touch moving across the touch screen. The moving touch may be used to perform drawing or drag-and-drop functions, for example. The profile for a moving touch may last for a relatively long time, for example, 2 sec or longer.

Figure 5:
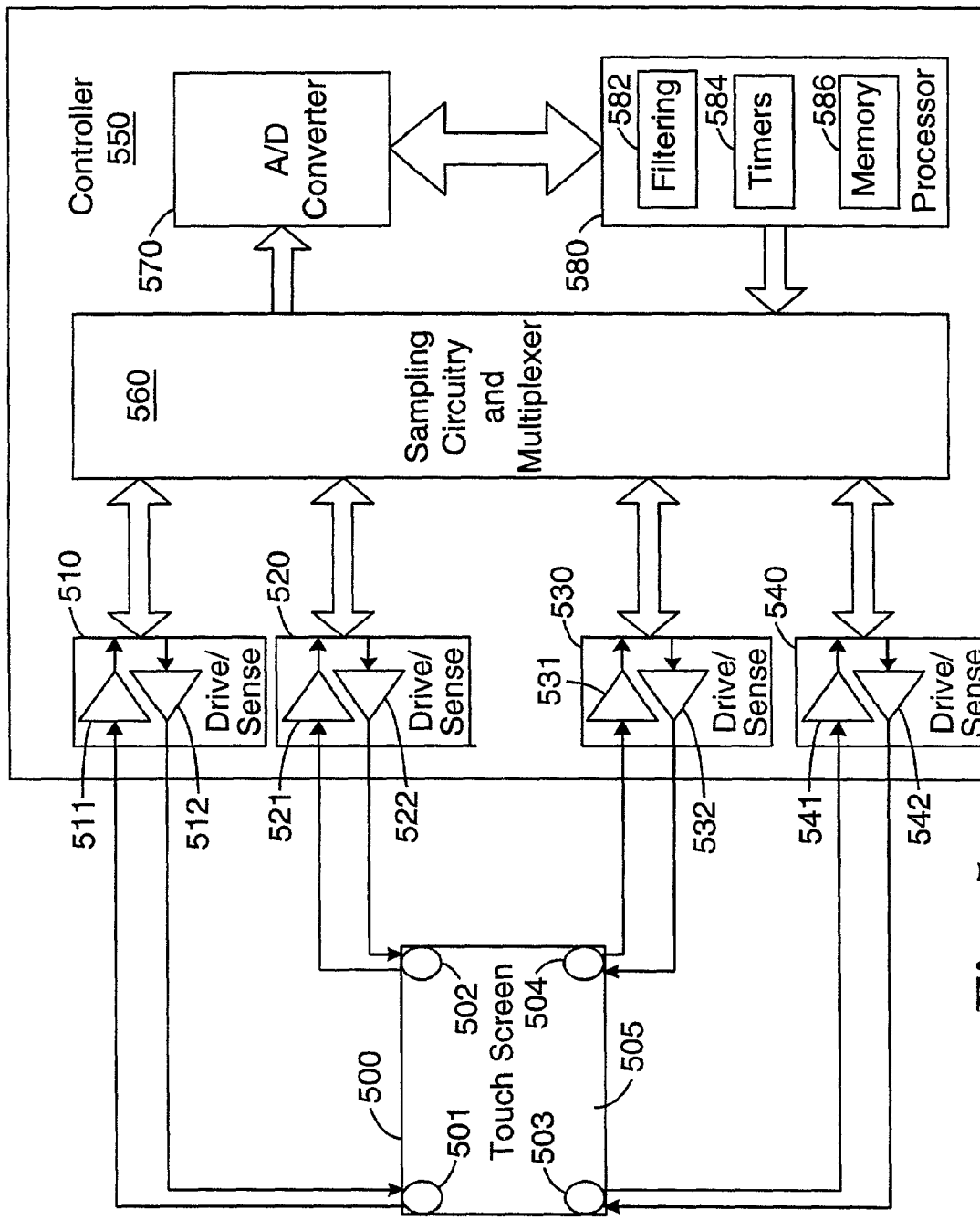
FIG. 5 is a block diagram of a touch screen and touch screen control system in accordance with an embodiment of the invention.

The sensor signals are directed to a control system that determines a touch location from the force responsive sensor signals. FIG. 5 schematically illustrates a block diagram of a touch screen 500 and touch screen control system 550 arranged in functional blocks in accordance with the principles of the present invention. It will be appreciated that there exist many possible configurations in which these functional blocks may be arranged. The example depicted in FIG. 5 is one possible functional arrangement.

In the exemplary embodiment illustrated in FIG. 5, a touch surface 505 is configured proximate to four force sensors 501, 502, 503, 504 arranged at the respective corners of the touch surface 505. The sensors 501, 502, 503, 504 may be chosen from a variety of sensing technologies, including capacitive, piezoelectric and strain gauge sensors. The sensors 501, 502, 503, 504 measure the force of a touch detected at the sensor locations and are coupled to drive/sense circuitry 510, 520, 530, 540 located within the control system 550. Alternatively, some components of the drive/sense circuitry may be located near the corresponding sensor. An energizing signal developed in the drive circuitry 512, 522, 532, 542 for each sensor is used to energize the sensors 501, 502, 503, 504. Each sensor 501, 502, 503, 504 produces a touch force signal corresponding to a touch force applied to the sensor through the touch surface 505. The touch force signal developed by each sensor 501, 502, 503, 504 is detected by sense circuitry 511, 521, 531, 541 located within the control system 550.

Analog voltages representing the touch force at each sensor location are produced by the sense circuitry 511, 521, 531, 541. The analog voltages are sampled and multiplexed by the sampling circuitry 560 at a rate sufficient to acquire an adequate representation of the force responsive sensor signals for determining touch presence and location. The sampled signals are digitized by an analog to digital (A/D) converter 570. The digitized sensor signals are directed to processor circuitry 580. The processor circuitry 580 performs calculations to determine a touch location. The processor circuitry 580 may also include filtering circuitry 582 for signal conditioning and memory circuitry 586 for storage of touch signal values. The processor circuitry 580 may also include one or more timers 584 for determining various interval and delay timing of the touch signal associated with determination of the preferred time for making the touch location measurement. The processor circuitry 580 may perform a number of additional control system functions, including controlling the touch signal sampling circuitry 560, the multiplexer circuitry 560, and the A/D converter 570.

It may be found advantageous to implement the touch screen control system 550, or its equivalent, on a single mixed-mode integrated circuit chip. In such an implementation, it may be advantageous to replace sampling circuitry 560 and A/D converter 570 with a set of delta-sigma converters operating in parallel, one for each signal channel.

Force based touch screens are potentially affected by errors in reported touch location arising from a number of sources. These errors may be categorized into three groups. First, touch location error may arise from touch-independent noise. Touch-independent error arises from noise sources or disturbances not correlated with the touch itself, and it is unpredictable for consecutive moments or consecutive touches. Second, there may be static touch location error in the reported touch location. Static touch location error is a reproducible function of the touch location and also of the steady-state force. Finally, dynamic touch location error may be introduced by the touch itself. Dynamic touch location error may occur during or immediately following a rapid change in the touch force.

A computation of touch position may be compatible with certain assumptions as to the physical processes generating the touch signals. Thus, touch locations computed from Equation 1 may be compatible with the physical assumption of operation in what may be termed the static limit. That is, Equation 1 may be accurate for the force and moments of a steady touch at a point, or for one evolving not too rapidly. For a fast enough change in the touch force, however, it may no longer be true that the forces at the sensors are continuously in static equilibrium with the force at the touch point, or only insignificantly removed therefrom. This may lead, for a particular touch signal shape, to reproducible and significant deviations of the touch signal values from those expected for continuous static equilibrium. This, in turn, may lead to reproducible deviations between computed touch locations and the actual locations. Such contributions to location error are herein denoted dynamic touch location error, or, equivalently, touch-induced location error. The corresponding signal deviations may be termed dynamic signal error, or, equivalently, touch-induced signal error. It is noted, however, that such reproducible signal error is defined with respect to a particular form of touch location computation, such as that of Equation 1. The errors apparent in the same signals may look different with respect to other forms of touch location computation; which forms could, in principle, compensate for dynamic effects by including appropriate sensitivity to recent signal history. Alternatively, and more simply, the method of the invention teaches the use of Equation 1 at a specific time of reduced error, which times are selected with appropriate sensitivity to recent signal history, as evidenced in the touch signal shape. Dynamic touch location error may be caused, for example, by damping error arising from the pneumatic effect of air trapped behind the touch surface. Damping error is greater at points of higher relative slope. When airflow from behind a force overlay is restricted, the damping effect of the structure creates significant errors in a touch signal. The damping errors may be reduced by increased porting and/or using a stiffer overlay. However, the touch signal may continue to exhibit errors when the touch force is rising rapidly.

The damping error presents as a pneumatic dashpot effect when air is trapped behind a touch surface structure. The cavity behind the touch surface is characterized by a total volume. Due to elastic flexure of the touch surface, a touch at a particular location is characterized by a change in the volume of the cavity behind the touch surface. The change in volume may lead to a transient difference in pressure across the touch surface structure, changing the force applied at the force sensors and introducing dynamic error. In a typical design, touches far from a force sensor cause greater flexure in the touch surface associated with a correspondingly greater volume change. In contrast, the flexure may be very small for touches close to the stiff support provided by a force sensor.

In one common case, airflow resistance arises primarily at the edges of a touch surface. This situation develops where the air beneath must escape through restrictions in a frame or seal that are smaller than the cavity behind the touch surface, for example, through restrictions in a frame or seal that are smaller than the space between the overlay and the display. The error force is then generated by a uniformly distributed pressure, and is equivalent to a single phantom error force applied at the center of the touch surface. In another example, the touch surface is positioned close to the display, but is fully open at its edges. In this situation, the phantom error force will fall somewhere between the center of the screen and the point of greatest flexure.

The damping effect described above delays the rise and fall of the total force measurement, while having little effect on the two measurements of moment about the X and Y axes. Thus, locations computed from data during the rising part of the touch signal profile are displaced radially outward from the true location. The computed location then travels inward through the true location and moves too far toward the center during the falling part of the profile. If the touch is a streaming touch that starts with the finger tapping down, the calculated location starts from the outside, moves through the true location inward and then moves back toward the true location.

Figure 17:
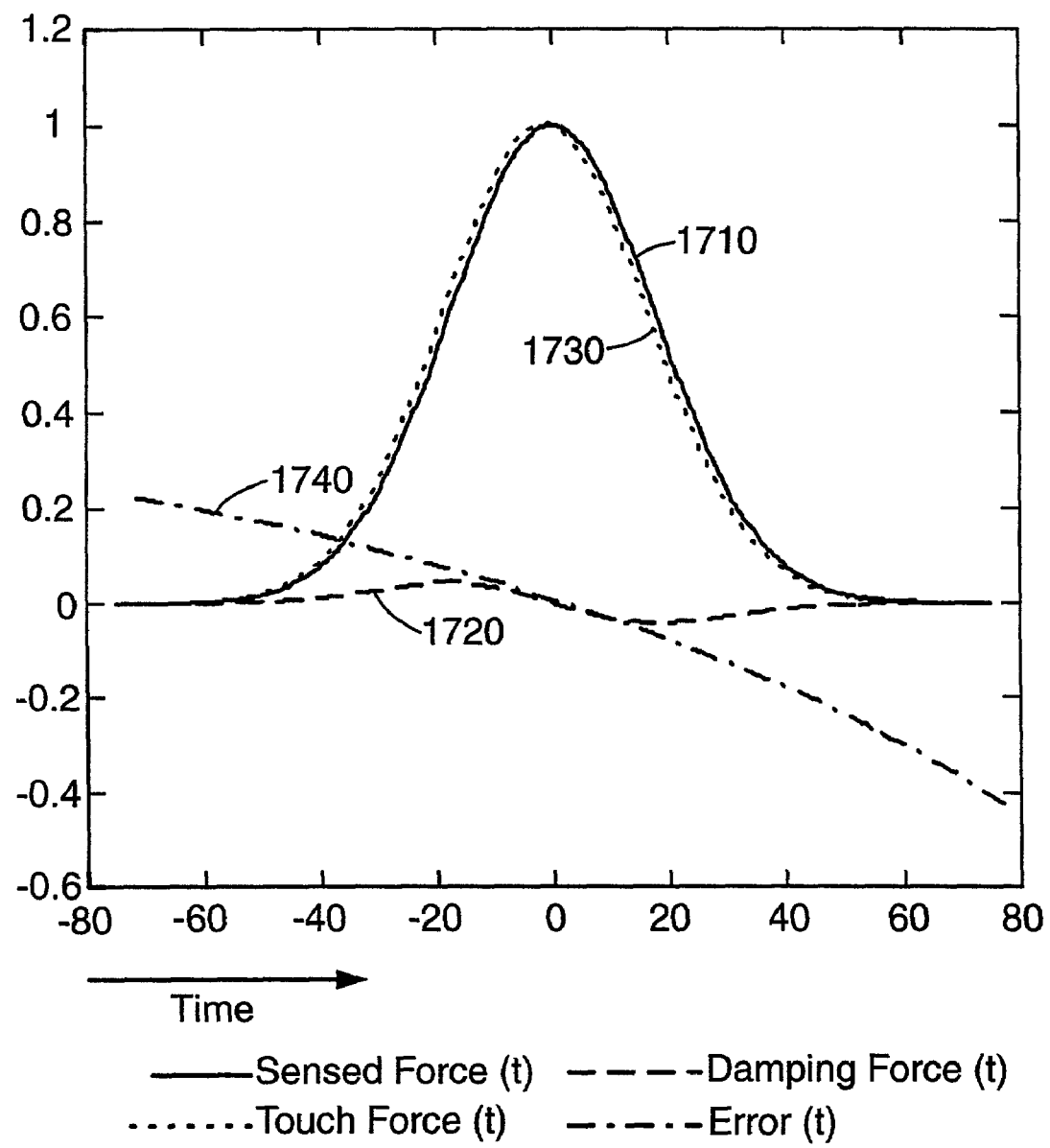
FIG. 17 illustrates signal alterations resulting from damping of touch surface motion.

An example of the error in $F_{Tz}$ from the damping effect that may give rise to radial position errors is illustrated in FIG. 17. FIG. 17 compares touch force, sensed force, and error signals with respect to time. The solid curve 1710 represents the total force normal to the touch surface passing through the force sensors, as it appears after filtering. A Gaussian curve is used in this example, because it is generally representative of a filtered tap touch signal. The long dashed curve 1720 represents the damping force that may resist the motion of a flexing touch surface. This is substantially proportional to the first time derivative of the sensor force curve. The sensor force is directly proportional to the touch surface flex, as it is the beam bending of the touch surface that transmits force to the sensors. The damping force is shown in FIG. 17 as having a peak value of about 4% of the maximum touch force, although the values may vary depending on the configuration of the touch surface structure. The short dashed graph 1730 represents the actual total applied force at the point of user contact, as it would appear after filtering, were a signal directly representative of this available. The graph 1730 represents the sum of the sensor forces and the damping forces, which in total balance the total applied touch force.

The stagger-dashed curve 1740 depicts, for each point in time, the fractional error that would result from taking the total sensor force 1710 to be the true touch force at the time. The graph 1740 depicts the fractional radial position error in the calculated touch signal when there is no damping effect on the moment measurements. Thus, in this example, a measurement taken at 25% of the pulse rise is computed to fall at a location displaced about 10% radially outward from the true location. A measurement taken at 75% of the pulse rise has a radial error of about 5%. A measurement taken at the peak has no error.

Another possible source of dynamic touch signal error resides in the mass of the touch surface structure which may produce inertial forces during flexure. As with the damping effects, these are greatest for forces producing the greatest flexure. Depending on the touch signal profile and the impulse response of the filter used for processing the touch signal, the lowest point of inertial error may or may not coincide with the lowest point of the damping effect error. The two errors may tend to cancel one another at some position in the time profile.

Inertial error resulting from the mass of the touch surface structure affects the total force measurement more than the moment measurements. The development of the total force at the sensors is at first delayed, then measures too large near the peak of the touch signal, and then measures too small again as the rebounding touch surface comes to a stop. The calculated touch location with a typical filter and a typical tap touch tends to travel inward through the true location point toward the center of the touch surface, then as the force peaks, travel towards the true location point again. If in such a system both damping and inertial errors are significant, the least error may result from choosing a time for touch location measurement slightly before the peak of the force.

Accurate touch location determination involves choosing a preferred time within the touch signal profile to measure the touch signal for determination of the touch location. The preferred time for touch location measurement occurs when the magnitude of the touch signal to be measured is high in comparison to the magnitude of the noise associated with various errors affecting the touch screen. Conventional methods of timing the touch location measurement represent an attempt to select a location measurement point having an acceptable signal-to-noise ratio as early as possible within the touch signal profile. These conventional methods of timing the touch location measurement are best adapted to situations where touch independent noise is dominant. Touch independent noise may be taken as having a fixed limit to its greatest expected value. In the situations contemplated by conventional methods, the touch location measurement point may be chosen to correspond to an amplitude of the touch signal that yields acceptable signal-to-noise ratio for the greatest expected noise value. If the touch location measurement is performed for the first touch signal data exceeding a given threshold value, the signal-to-noise ratio for that touch signal data should equal or exceed the ratio of the threshold value to the greatest likely noise value. Thus, a sufficiently high threshold point may be associated with assurance of a certain level of accuracy in the calculated touch location.

The conventional method of calculating touch location using the first touch data exceeding a particular threshold point may not be effective in the presence of touch induced noise. When touch induced noise is present, the greatest likely signal-to-noise ratio may not be a function of the touch signal amplitude alone because the dynamic touch induced noise may increase along with the touch signal as the touch force increases. Therefore, a threshold point representing a particular amplitude of the touch signal may not be associated with a particular signal-to-noise ratio.

Further, when touch induced noise is present, the signal-to-noise ratio may vary systematically with the touch signal profile and may consistently take on a maximum value at a particular time within the profile. Both the time and magnitude of the signal-to-noise ratio maximum value may be usefully predictable from the touch signal profile.

Therefore, in the presence of touch induced noise, a preferred time for making the touch location measurement is not entirely dependent on making the location measurement at the earliest point the touch signal rises above a particular amplitude, as in conventional methods. Touch induced noise may decrease as the signal level increases through some initial portion of the touch signal profile. Thus a preferred time to make the touch location measurement may depend upon recognizing an improved signal-to-noise ratio due to diminished noise amplitude as well as increased touch signal amplitude. The preferred time to make the touch location measurement may be somewhat delayed with respect to the conventional method of acquiring a location measurement at the earliest time the signal rises above a certain level. However, in many applications, the slight delay in acquiring touch location information is undetectable by the user. Further, the enhanced accuracy achieved by making the touch location measurement at a preferred time of lowest noise outweighs any slight delay in acquiring the location measurement. The present invention provides a method and system that advantageously determines a preferred time for making the touch location measurement in the presence of touch induced errors and other error sources.

Two touch signals of different strengths may be considered to have the same profile if they have the same duration, and if the amplitude of one is equal to a constant scalar multiple of the amplitude of the other at each point. According to the methods of the present invention, a preferred time for touch location measurement represents a point of relatively small dynamic touch induced error. Further, the preferred time for touch location measurement tends to be characterized by a feature of a touch signal shape that is associated with a particular time within a given touch signal profile, regardless of the touch signal strength. Methods of the present invention may be contrasted to prior art methods that use fixed amplitude thresholds. Such conventional methods calculate touch location from data taken at variable times within a given touch signal profile. By conventional methods, the touch locations of progressively stronger touches, with the same touch signal profiles, are calculated from data taken at progressively earlier points.

According to the present invention, touch location may be calculated from data gathered at a preferred time within the touch signal profile. Accurate determination of the preferred time for touch location measurement by this method may entail two decisions: 1) a decision that a touch event has begun, and 2) a decision that a preferred time for touch location measurement has occurred. These decisions may be made in either order, or together. Both decisions, however, may be responsive to some range of the recent history of the touch signal, as well as to the signal value at the time of touch location measurement. Thus, a touch condition may first be determined, as by the touch signal exceeding a predetermined threshold. In contrast to conventional methods, when the touch signal exceeds a predetermined threshold, a touch condition is detected, however a touch location measurement is not performed. A location point may be established when a preferred time for making a touch location measurement condition is satisfied. Alternatively, the presence of a preferred time for location measurement condition may be established first, and then the force history examined. If the force history shows a smooth rise of sufficient magnitude from a quiescent level, a touch condition may be considered to exist and the preferred time for location measurement is taken at the point the preferred time condition occurs.

A preferred time for touch location measurement may be determined from a touch signal acquired by summing the output of all the sensor signals. However, in some applications, it may be advantageous to determine a preferred time from one sensor signal or from various combinations of sensor signals. In addition, a different preferred time for touch location measurement may be determined for each sensor signal. Touch location accuracy may also be improved by interpolating a touch signal or sensor signal to find a signal value for location measurement between touch signal sample values.

It should be noted that the threshold values or force signal history used to signify a touch input need bear no relationship to the thresholds used in conventional methods to determine touch location. As such, the present invention can be used to determine the location of relatively small magnitude touch inputs that would not have been registered using conventional methods for lack of reaching a predetermined value.

According to the present invention, a method for determining a touch location involves identifying a feature of a touch signal shape correlated to a period of relatively low touch signal noise. The detection of the feature in the touch signal profile corresponds to a preferred time for making a touch signal measurement to determine the touch location. In one example, the feature of the touch signal shape used to initiate a touch location measurement is the slope of the touch signal. When the slope of the touch signal is equal to a predetermined value, the touch location measurement may be made. In another example, a relative slope may be employed as the touch signal shape used to trigger a touch location measurement. The relative slope may be calculated as the touch signal slope at a particular time divided by the magnitude of the touch signal at the particular time.

The flowcharts of FIGS. 6A-6E illustrate, in broad and general terms, various methods of the present invention. The method of the invention illustrated conceptually in the flowchart of FIG. 6A involves acquiring a touch signal corresponding to a touch on the touch screen 605. A first occurrence of a touch signal shape in the touch signal is detected 610. Touch location is determined using touch signal information obtained in response to detecting the touch signal shape 615.

Figure 6A:
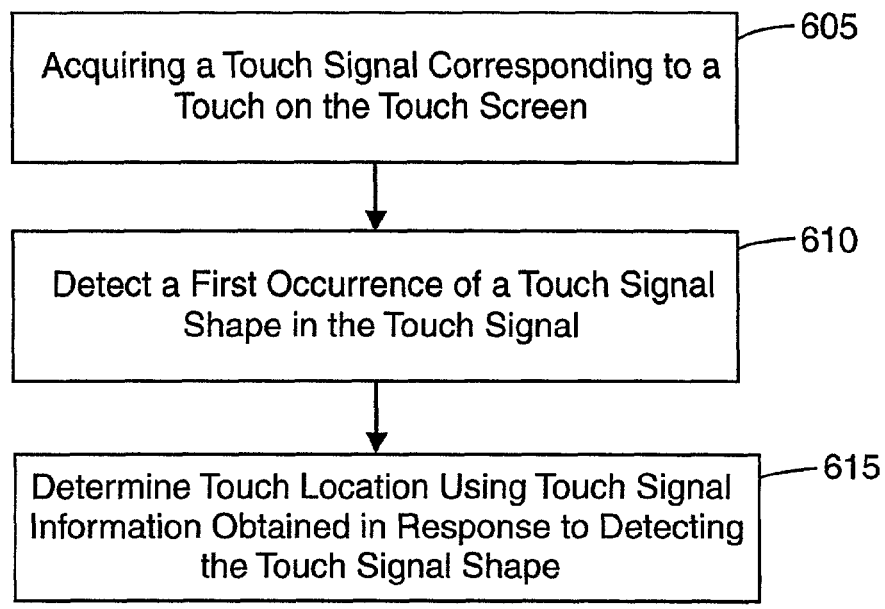
FIGS. 6A-6E are conceptual flowcharts illustrating various methods of determining touch location in accordance with embodiments of the invention.
Figure 6B:
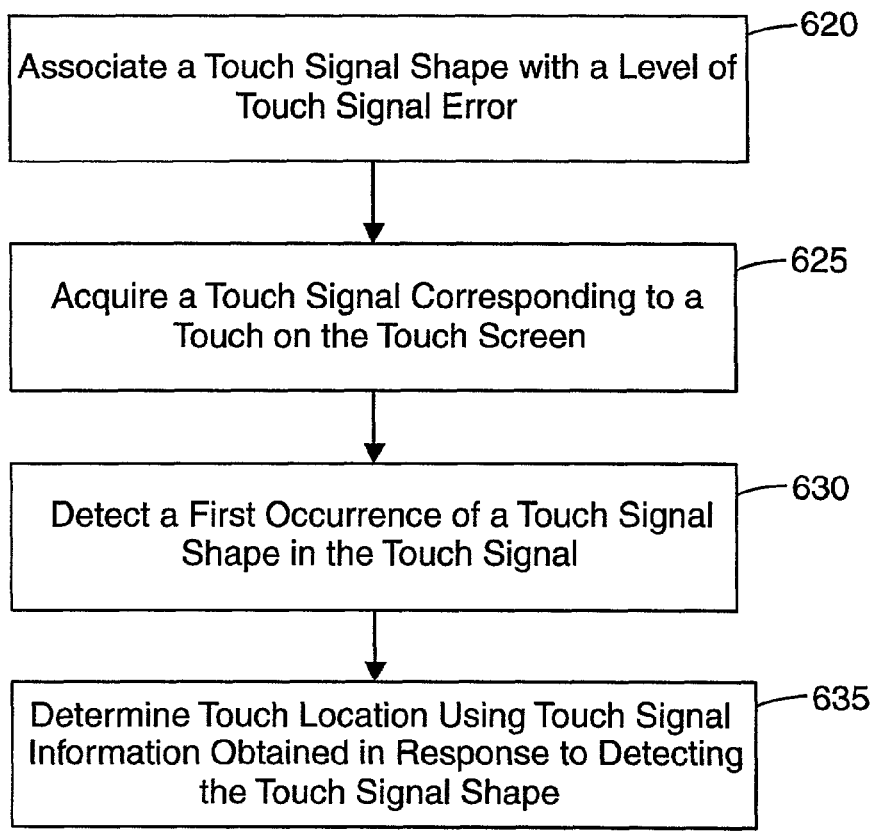

In accordance with another method of the invention, illustrated in FIG. 6B, a touch signal shape is associated with a level of touch signal error 620. The level of touch signal error may represent a relatively low level of error in comparison to a maximum touch signal error. Identification of the touch signal shape associated with the level of touch signal error may be calculated from known properties of the touch screen design, or may be determined by other means. A touch signal corresponding to a touch on a touch screen is acquired 625 and a first occurrence of the touch signal shape in the touch signal is detected 630. Touch location is determined using touch signal information obtained in response to detecting the touch signal shape 635.

Figure 6C:
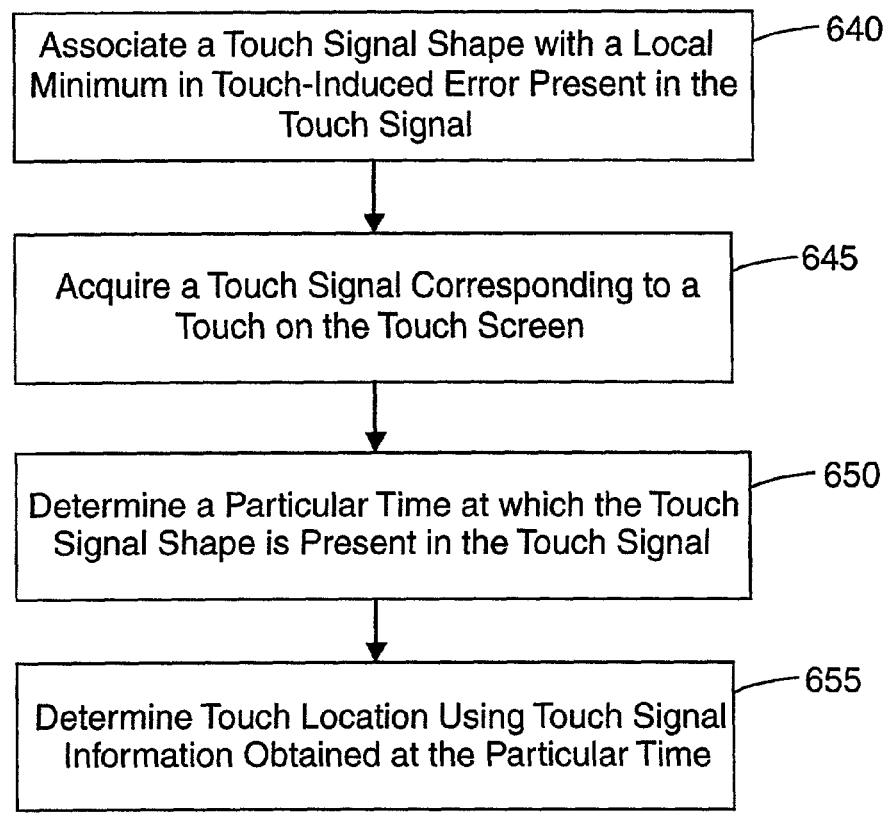

Another method of the invention, illustrated conceptually in the flowchart of FIG. 6C involves associating a touch signal shape with a local minimum in touch-induced error present in the touch signal 640. The touch-induced error may, for example, comprise damping effect errors and/or inertial effect errors. A touch signal corresponding to a touch on the touch screen is acquired 645 and a particular time at which the touch signal shape is present in the touch signal is determined 650. Touch location is determined using touch signal information obtained at the particular time 655.

Figure 6D:
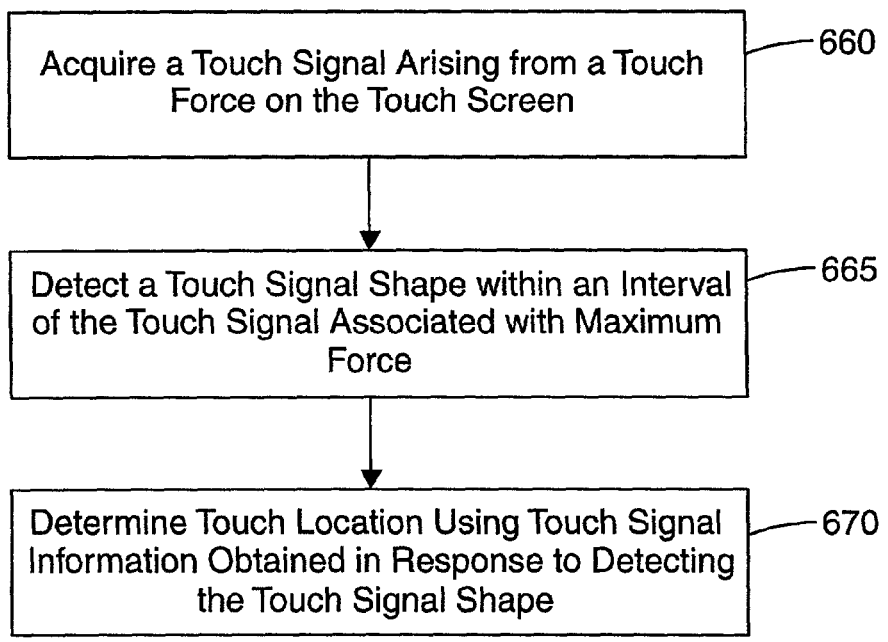
Figure 6E:
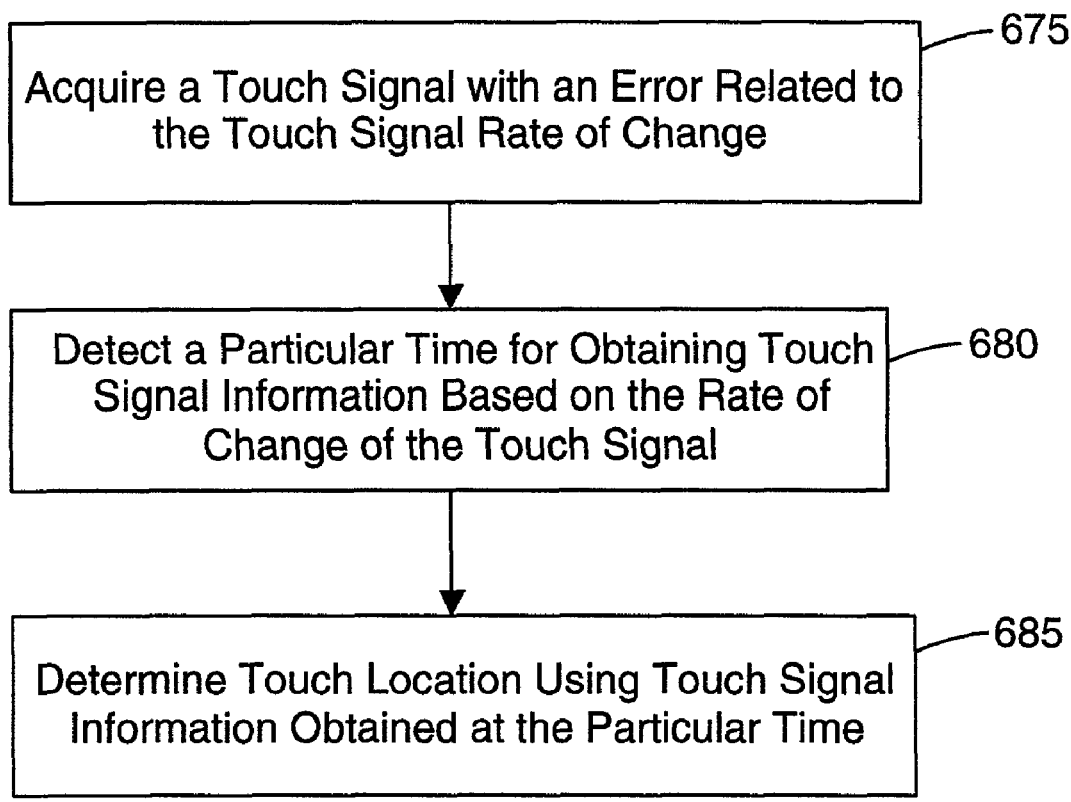

A further method of the invention is conceptually illustrated in the flowchart of FIG. 6D. According to this method, a touch signal arising from a touch force on the touch screen is acquired 660. A touch signal shape within an interval of the touch signal associated with maximum force is detected 665. The interval associated with maximum touch force may begin with the first application of a touch and end at a time beyond the touch signal peak. In one example, the interval ends when the touch signal slope corresponds to a predetermined value. In another example, the interval ends when the touch signal falls below a predetermined magnitude. Touch location is determined using touch signal information measured in response to detection of the touch signal shape 670.

In yet another approach of the present invention, a touch signal with an error related to the rate of change of the touch signal is acquired 675. A particular time for obtaining touch signal information is detected based on the rate of change of the touch signal 680. Touch location is determined using touch signal information obtained at the particular time 685.

Figure 7:
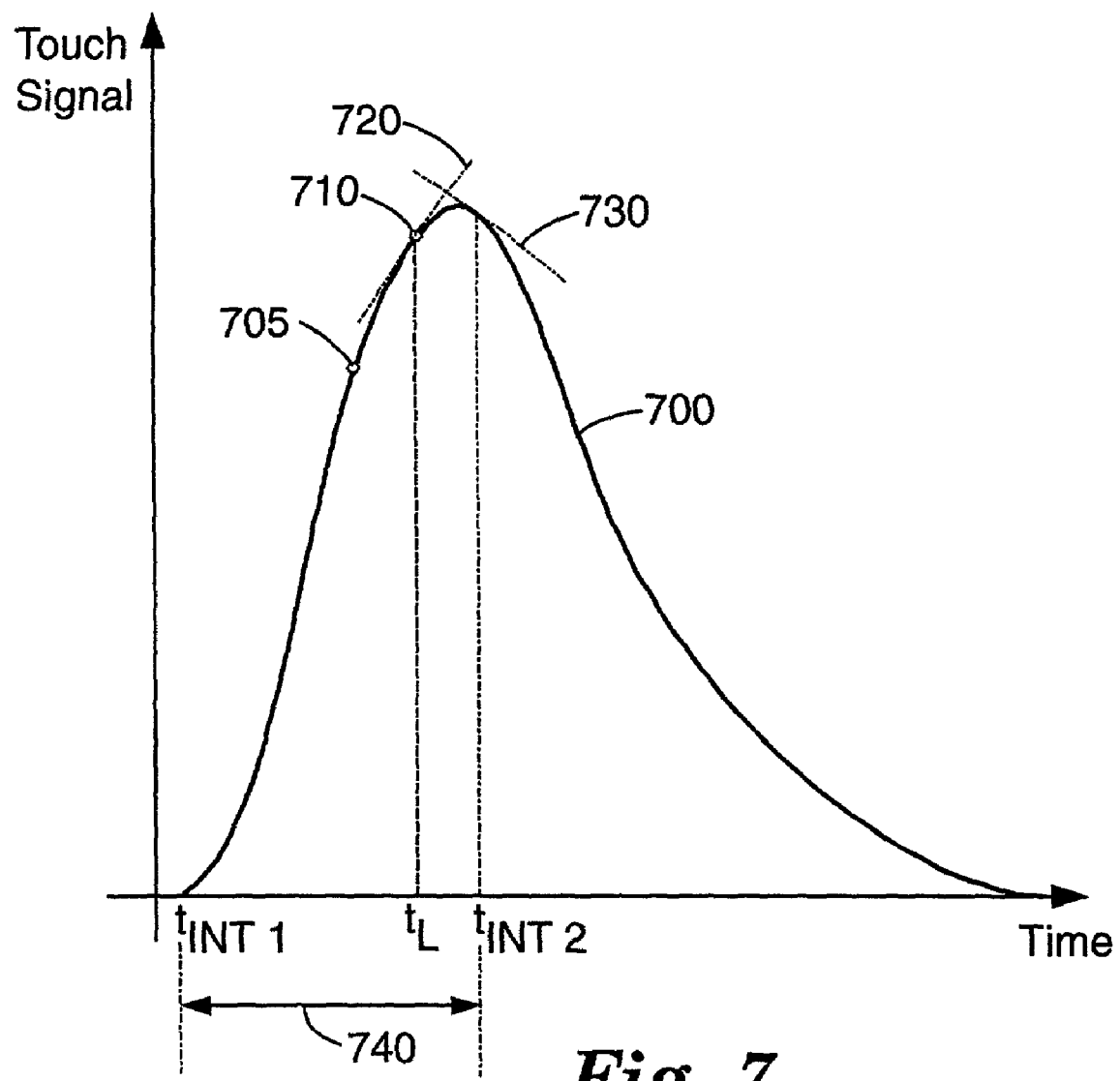
FIG. 7 illustrates a touch signal threshold point and a touch signal location point for obtaining touch location information in accordance with an embodiment of the invention.

The methods illustrated in the flowcharts of FIGS. 6A-6E are further illustrated by the graph of FIG. 7. FIG. 7 illustrates an exemplary graph of a touch signal 700 representing a touch force with a typical profile and duration. Signals from one or more force sensors may be processed using a variety of filtering and/or processing techniques and combined to form the touch signal 700. A decision that a touch event has begun may, for example, correspond to detection of a touch presence threshold point 705. A touch signal shape 720 falling within an interval of maximum touch force 740 gives a location point 710 corresponding to a preferred time for obtaining touch location information, $t_L$. The touch signal shape corresponding to the preferred time for obtaining touch location information may be a predetermined slope of the touch signal, for example. The interval associated with a touch signal maximum may begin at the time a touch is applied $t_{INT1}$, and end when the touch signal slope corresponds to a predetermined value 730 at time $t_{INT2}$ following the touch force peak. Alternatively, the interval may end when the touch signal falls below a predetermined magnitude. The predetermined magnitude ending the interval may be selected to correlate to the time the touch is removed from the touch screen, for example.

The touch location measurement may be improved using low pass LTI filters, such as a FIR or IIR filters, for processing the touch signal. Filtering may be applied to the sensor signals or to linear combinations of the sensor signals such as the sum of the sensor signals representing the total touch force. Due to the need to suppress high frequency mechanical resonances, the LTI filters chosen may exhibit an impulse response broader than the duration of a typical tap touch. This may mean that for rapid touches wherein reducing the effects of touch induced noise is most important, the shape of the filtered touch signal profile corresponds closely to the filter impulse response. Filtering the touch signal in this manner may provide a degree of consistency and predictability to rapid touch signals with the highest component of touch induced error. Further, the shape of rapid touch signals may be controllable to some degree by selection of a particular filter impulse response. The ability to control and predict the shape of rapidly changing touch signal may lead to simpler and more effective determination of the preferred time for touch location measurement. For example, when all forms of touch induced noise are considered, the point of highest signal to noise ratio may occur at a point slightly removed from the peak. With a tap touch creating a consistent filtered touch signal profile, the preferred time may be obtained at a specified time offset from the peak, or a specific non-zero value of the relative slope.

Figure 8:
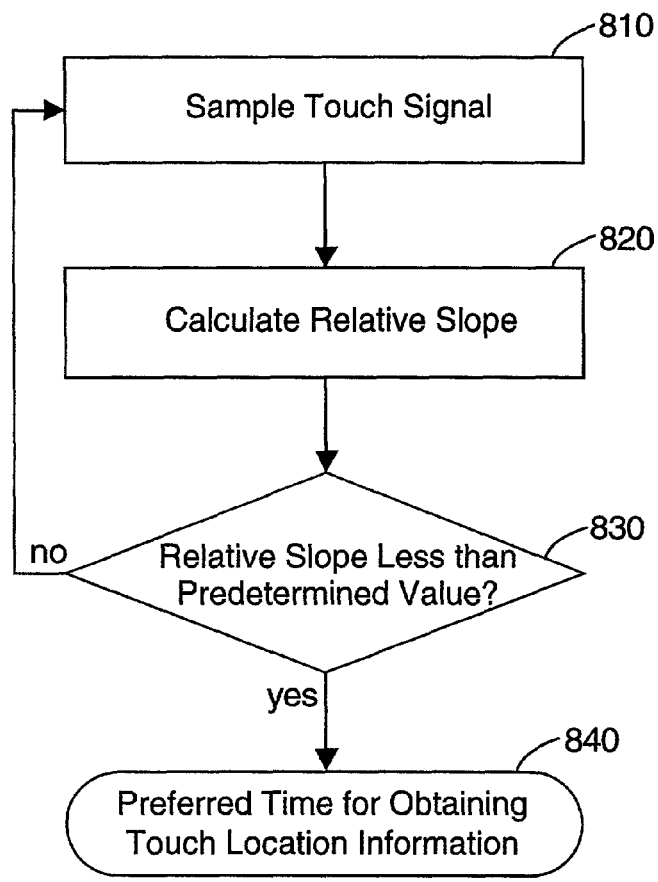
FIG. 8 is a flowchart of a method for determining a preferred time for touch location based on a predetermined value of a relative slope in accordance with an embodiment of the invention.

According to various embodiments of the invention, a preferred time for a touch location measurement may be determined by several methods illustrated in FIGS. 8-11. In one embodiment, illustrated in the flowchart of FIG. 8, the preferred time may be taken to be the first time that the relative slope drops below a predetermined value. As illustrated in FIG. 8, the touch signal is sampled 810 and the relative slope is calculated 820 by the method previously discussed. When the relative slope falls below a predetermined value 830, the touch location measurement is made 840.

Figure 9:
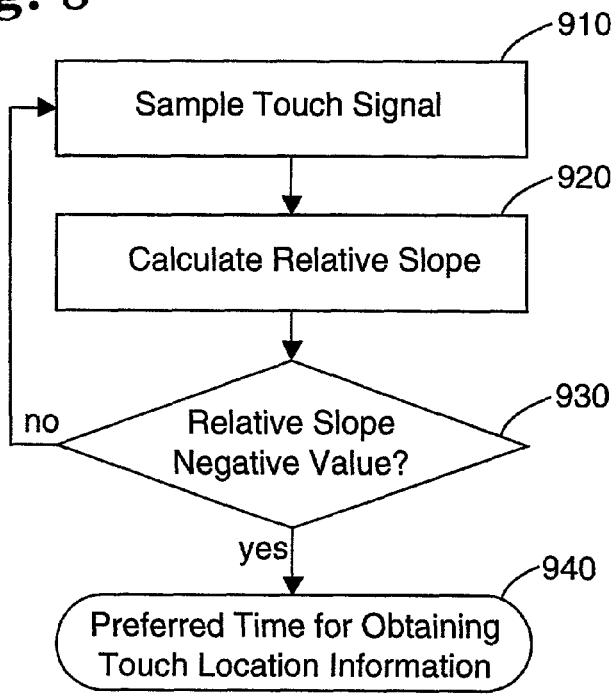
FIG. 9 is a flowchart of a method for determining a preferred time for touch location based on a change of sign of a relative slope in accordance with an embodiment of the invention.

In another embodiment, illustrated in FIG. 9, the preferred time for the touch location measurement may be the peak value of the touch signal. Determining a preferred time for touch location measurement based on detection of a peak may be embodied in several ways. The first time derivative of the time profile may be approximated by subtracting the total force measured at time, $t_1$, from the total force measured at a slightly later time, $t_2$. The relative slope may then be taken as the ratio of this difference to the total force at time $t_2$.

In one embodiment, the preferred time for touch location measurement is the point at which the relative slope, or equivalently in this case, the absolute slope, changes sign from positive to negative indicating the touch signal peak. The touch signal is sampled 910 and the relative slope is calculated 920. Initially, as the touch signal rises, the relative slope is positive. When the relative slope becomes negative 930, the peak is detected and the touch location measurement is made 940.

Figure 10:
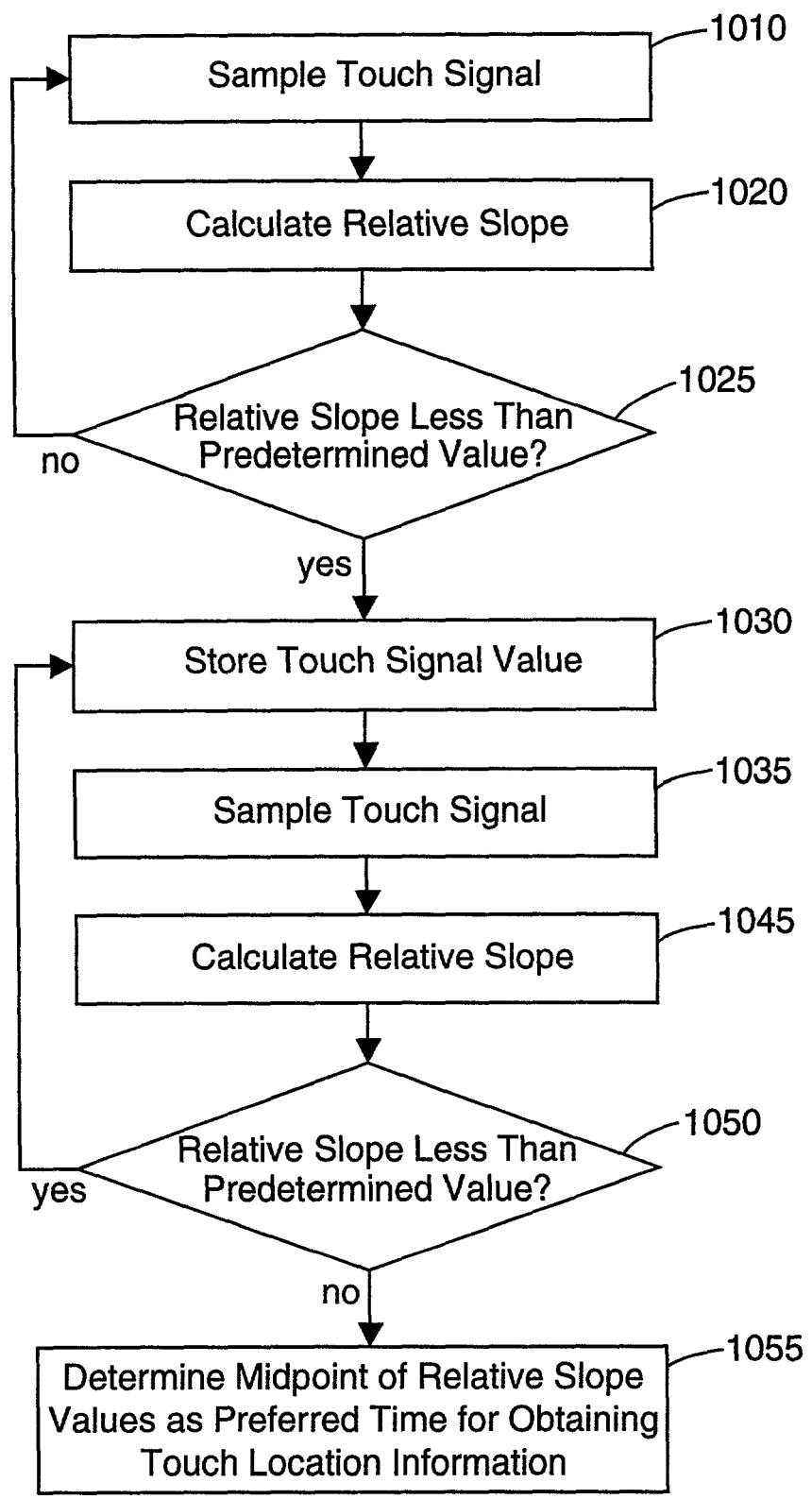
FIG. 10 is a flowchart of a method of determining a preferred time for touch location based on a midpoint of a range of the touch signal corresponding to a predetermined value of a relative slope in accordance with an embodiment of the invention.

The flowchart of FIG. 10 illustrates another embodiment, wherein the preferred time may be taken to fall halfway through the greatest interval for which the absolute value of the relative slope is below some predetermined value. The touch signal is sampled 1010 and the relative slope is calculated 1020. In response to the relative slope of the touch signal falling below a predetermined value 1025, the touch signal value is stored 1030. The touch signal is sampled 1035 and the touch signal values are stored 1030 according to the loop defined by steps 1030-1050 so long as the relative slope calculated at step 1045 is below a predetermined value 1050. When the relative slope is greater than or equal to the predetermined value 1050, the preferred time for making the touch location measurement is determined as the point halfway through the stream of stored touch signal values 1055. This approach locates the center of a broad peak by first finding its edges, and may be more suitable for a filter impulse response with a relatively broad and flat top. The approach requires retaining data in memory long enough to retrieve the mid-peak values when both edges of the broad peak are determined.

Figure 11:
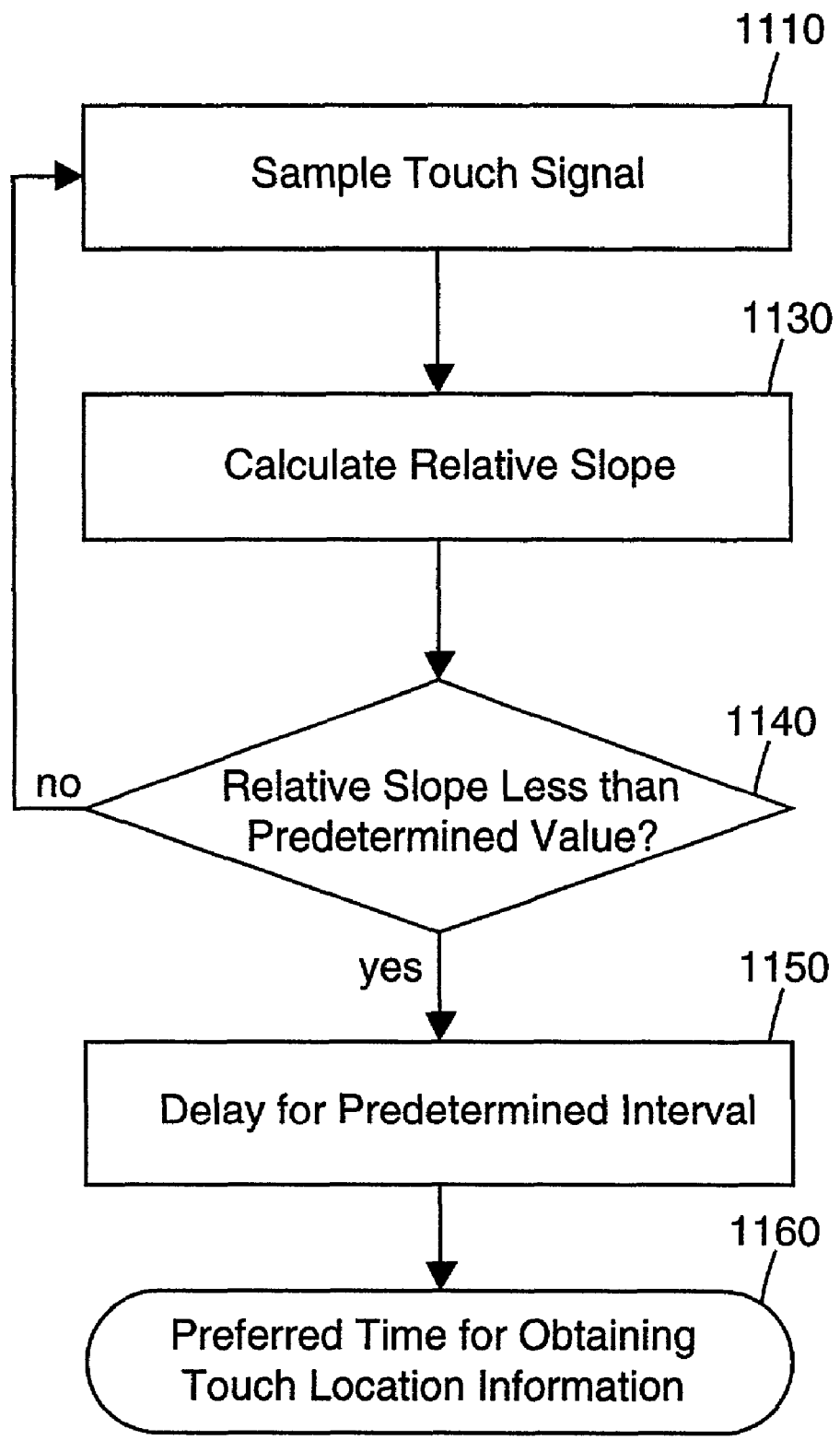
FIG. 11 is a flowchart of a method of determining a preferred time selected as a time following a predetermined delay following a touch signal value corresponding to a predetermined value of a relative slope in accordance with an embodiment of the invention.

Another embodiment is illustrated in the flowchart of FIG. 11, wherein the preferred time for the touch location measurement falls at a fixed delay interval after the relative slope decreases below a predetermined value. The delay interval may be chosen to match half the peak width of a broad and flat topped impulse response that has been provided by the filter. A touch signal is sampled 1110 and the relative slope is calculated 1130. In response to the relative slope decreasing below a predetermined value 1140, a delay is initiated for a predetermined interval 1150. Following the delay interval, the touch location measurement is made 1160. Other methods and variations for determining a preferred time for making the touch location measurement will be evident to those skilled in the art.

Two additional concerns may arise in the case of soft touches or streaming touches. For soft touches, there is potential for a sufficiently slow touch to take an excessive amount of time to trigger a preferred time for touch location measurement. The delay may be viewed as excessive if it is noticeable to the user, and if an earlier response could have been provided with sufficient accuracy. Another concern may be to provide a continuous or streaming flow of location coordinates for a moving touch used to perform drawing or drag-and-drop functions.

Figure 12:
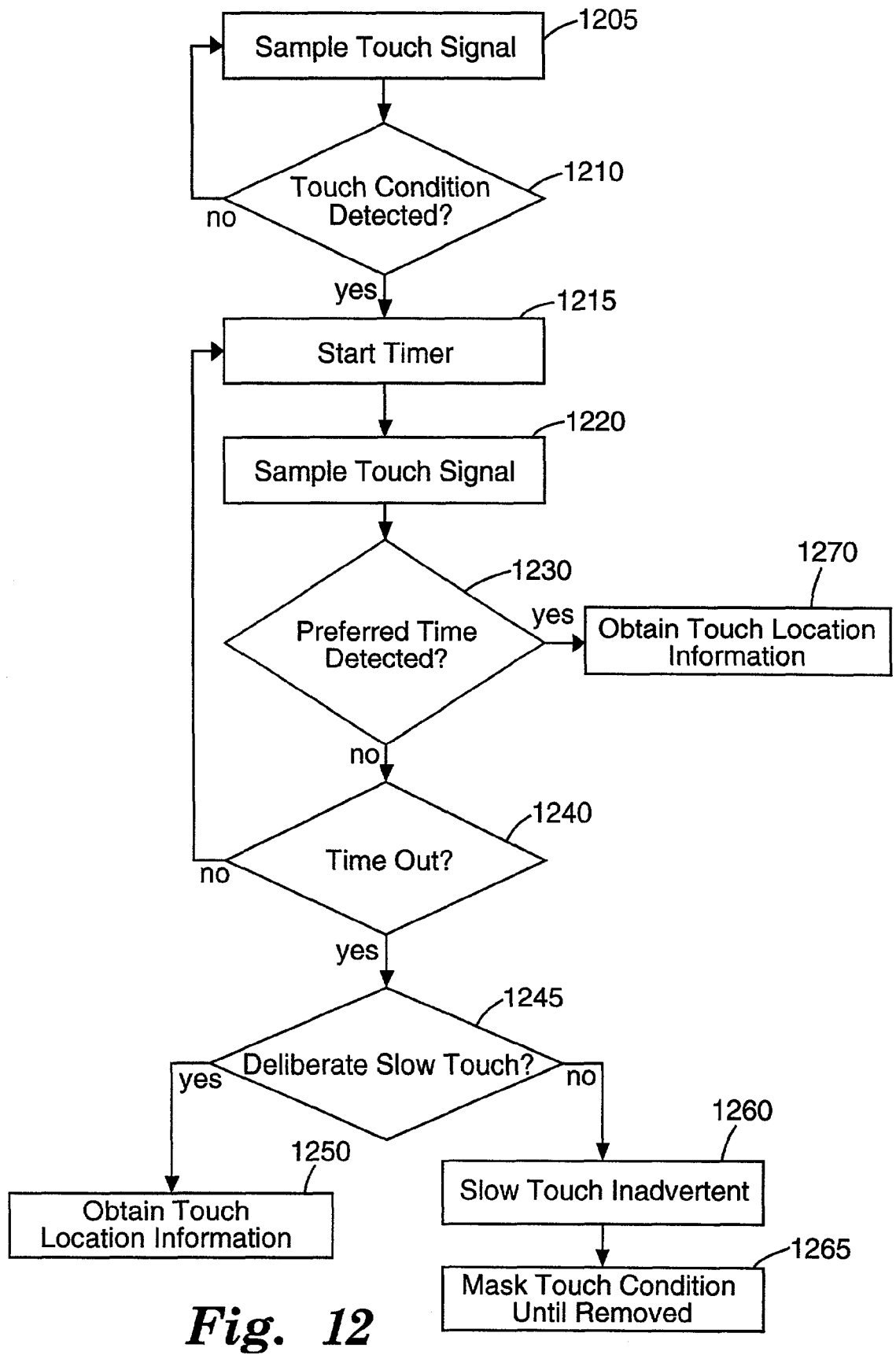
FIG. 12 is a flowchart of a method of determining a preferred time for touch location measurement for a slow touch in accordance with an embodiment of the invention.

One embodiment of the invention, illustrated in the flowchart of FIG. 12, reduces the effect of excessive delay in determining the preferred time for making a touch location measurement in the case of a slow touch. To mitigate the effect of excessive delay, the time elapsed since the current touch condition has first been detected may be monitored, and a time-out may be asserted if the delay exceeds a predetermined value before the preferred time for touch location measurement has been determined. As illustrated in FIG. 12, the touch signal is sampled 1205 until a touch condition is detected 1210. In response to detecting the touch condition 1210, the touch signal continues to be sampled while a timer is incremented 1215, 1220. If the preferred time of the touch location measurement is detected 1230 before time out 1240, then the touch location measurement is made 1270. If the preferred time of the touch location measurement is not detected prior to time out 1240, then the action taken may depend on the application. Where such slow touches are taken as deliberate 1245, a location measurement point may be established at time-out 1250. In one example, the touch system may be set up by the user to assume slow touches are deliberate. In another example, the controller may be configured to determine when a slow touch may be taken as deliberate. As the slow nature of the touch creates little touch-dependent error, the touch location measurement need not be taken at the preferred time in order to achieve sufficient accuracy. Where the nature of the application suggests that such slow touches are not deliberate 1245, but result from inadvertent contact 1260, the touch signal may be masked until the current touch condition is removed 1265, indicated by a touch signal magnitude decreasing below a threshold, and a new one established, indicated by the touch signal magnitude rising above a threshold.

A streaming touch signal indicates movement of a touch across the surface of the touch screen. This type of touch generates a flow of touch coordinate positions that are reported following the initial touch down coordinates, and that may be continued until the touch condition ends, as by the touch signal falling below a predetermined fixed threshold. The initial coordinates at touch down may be computed in accordance with a location measurement point established by any of the above methods. Generally, the streaming coordinate values will be computed continuously from the current stream of processed and filtered force sensor data, optionally with additional filtering to smooth the path described by the coordinate stream. When the force is changing rapidly, however, there may be potential for error from touch-dependent dynamic noise. At such times, it may be advantageous to omit coordinate outputs, or to repeat the last set of accurate values, until the force is again free of such rapid change. Such change often occurs as a quick dip in force right after touch down, and again at the end of the touch, if the finger is lifted abruptly.

Figure 13:
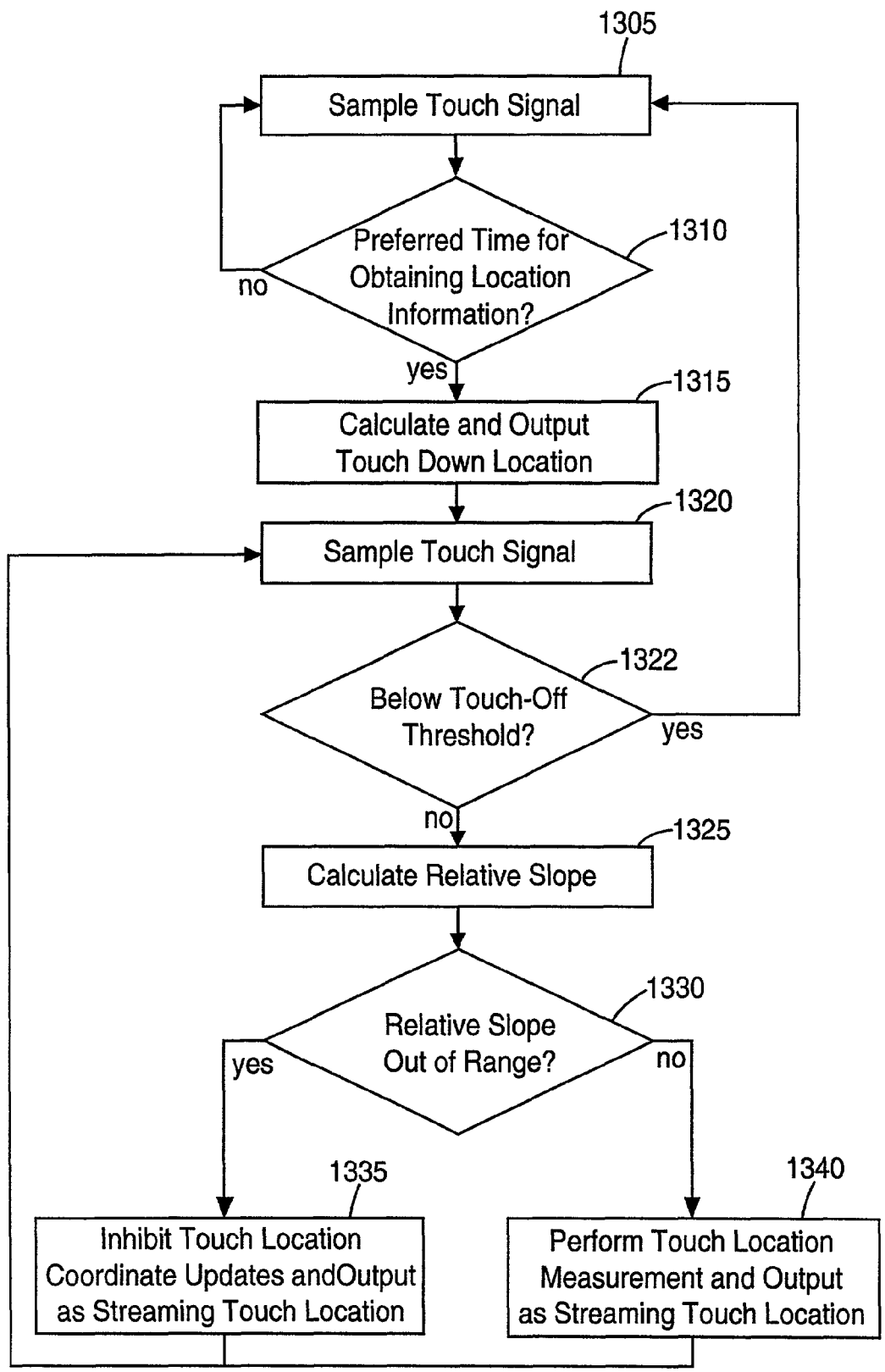
FIG. 13 is a flowchart of a method of inhibiting touch location values for a streaming touch when the relative slope is outside a predetermined range in accordance with an embodiment of the invention.

In one embodiment, improved streaming performance is achieved by inhibiting coordinate updates whenever the relative slope falls outside a predetermined range around zero. This embodiment is illustrated in the flowchart of FIG. 13. The touch signal is sampled 1305 until the preferred time for touch location measurement is detected 1310. In response to detecting a preferred time for location measurement 1310, the touch down location is calculated 1315 and output. In the case of a streaming touch, the touch is being moved across the surface of the touch screen, creating a continuous touch condition. The touch signal continues to be sampled 1320 and the total touch force compared to a predetermined touch-off threshold 1322. If the force is below the streaming threshold, streaming touch output ceases. The computation state may now, for example, return to wait for the next touch 1305.

While the total force continues to exceed the touch-off threshold, the relative slope of the signal calculated 1325. If the relative slope falls outside a predetermined range 1330, such as a range around zero, this indicates a rapidly changing signal that may be erroneous due to touch-dependent dynamic error. In this case, the touch location coordinate updates are inhibited and the most recently computed location values are output 1335. If the relative slope remains within the predetermined range 1330, for example, a range around zero 1330, an additional touch location measurement is made and output as a streaming touch location 1340.

Figure 14:
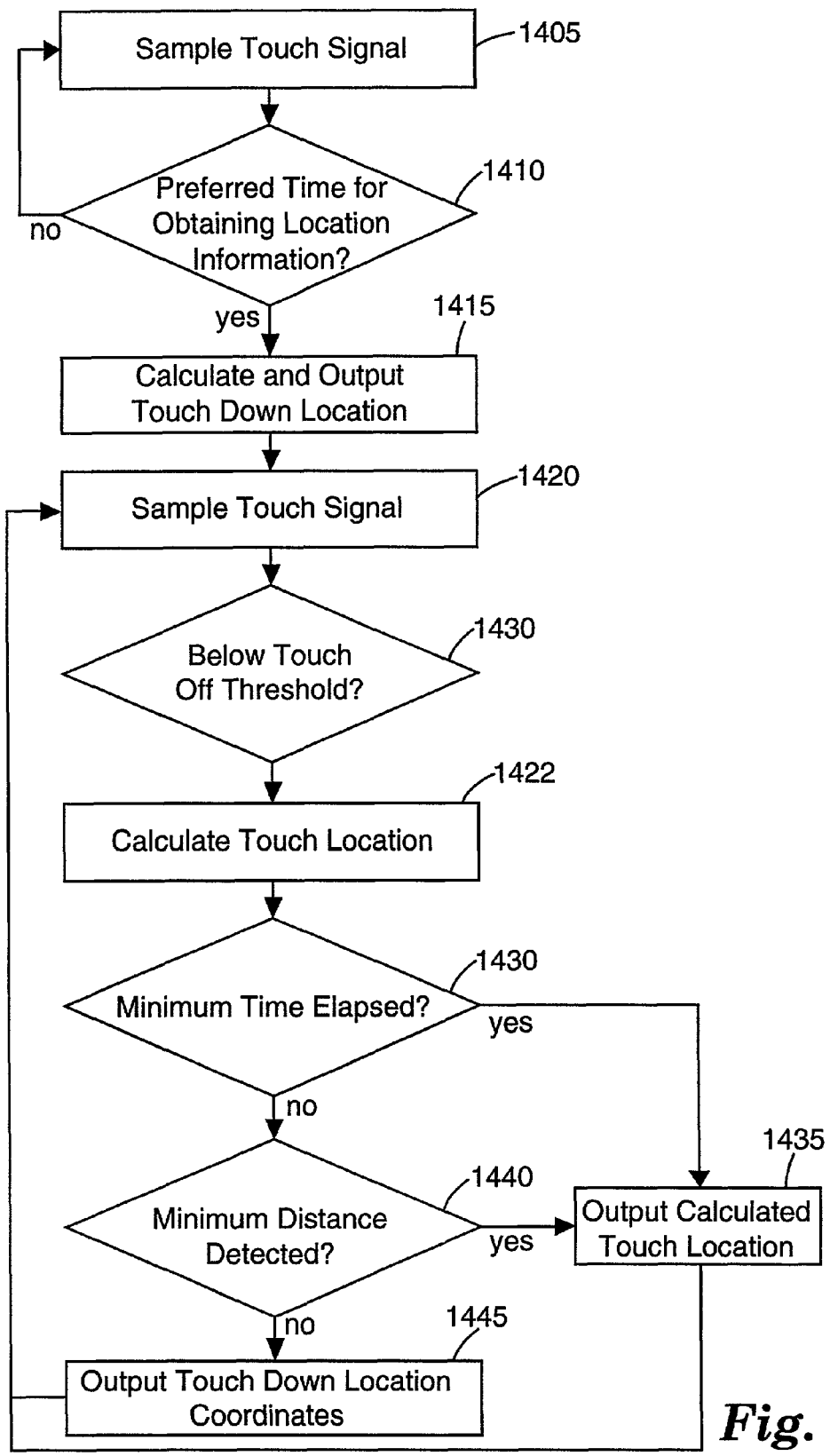
FIG. 14 is a flowchart of a method for determining touch location for a streaming touch in accordance with an embodiment of the invention.

In another embodiment, the first streaming coordinates obtained after touchdown repeat the touch down values for either a predetermined minimum time, or until the streaming location moves at least a minimum predetermined distance. This embodiment is illustrated by the flowchart of FIG. 14. The touch signal is sampled 1405 until a preferred time for the touch location measurement is detected 1410. When the preferred time for touch location measurement is detected 1410, the touch down location is calculated and output 1415. In the case of a streaming touch, the touch is being moved across the surface of the touch screen, creating a continuous touch condition. The touch signal continues to be sampled 1420 and the total touch force compared to a predetermined touch-off threshold 1422. If the force is below the touch off threshold, streaming touch output ceases. The computation state may now, for example, return to sample the touch signal 1405 to await the next touch. While the total force continues to exceed the touch-off threshold, the touch location coordinates are calculated 1425. If a predetermined minimum time has elapsed since touch down 1430, the newly calculated touch location coordinates are output 1435. Also, if a distance between the touch down location and the present touch location exceeds a predetermined minimum distance 1440, the newly calculated touch location coordinates are output 1435. If the predetermined minimum time has not elapsed 1430 and the touch location has not moved the predetermined minimum distance from the touch down location 1440, the touchdown coordinates are repeated 1445. If additional filtering is applied to the coordinate locations just prior to the final output, it may be advantageous to freeze the filter inputs rather than the outputs.

Figure 15:
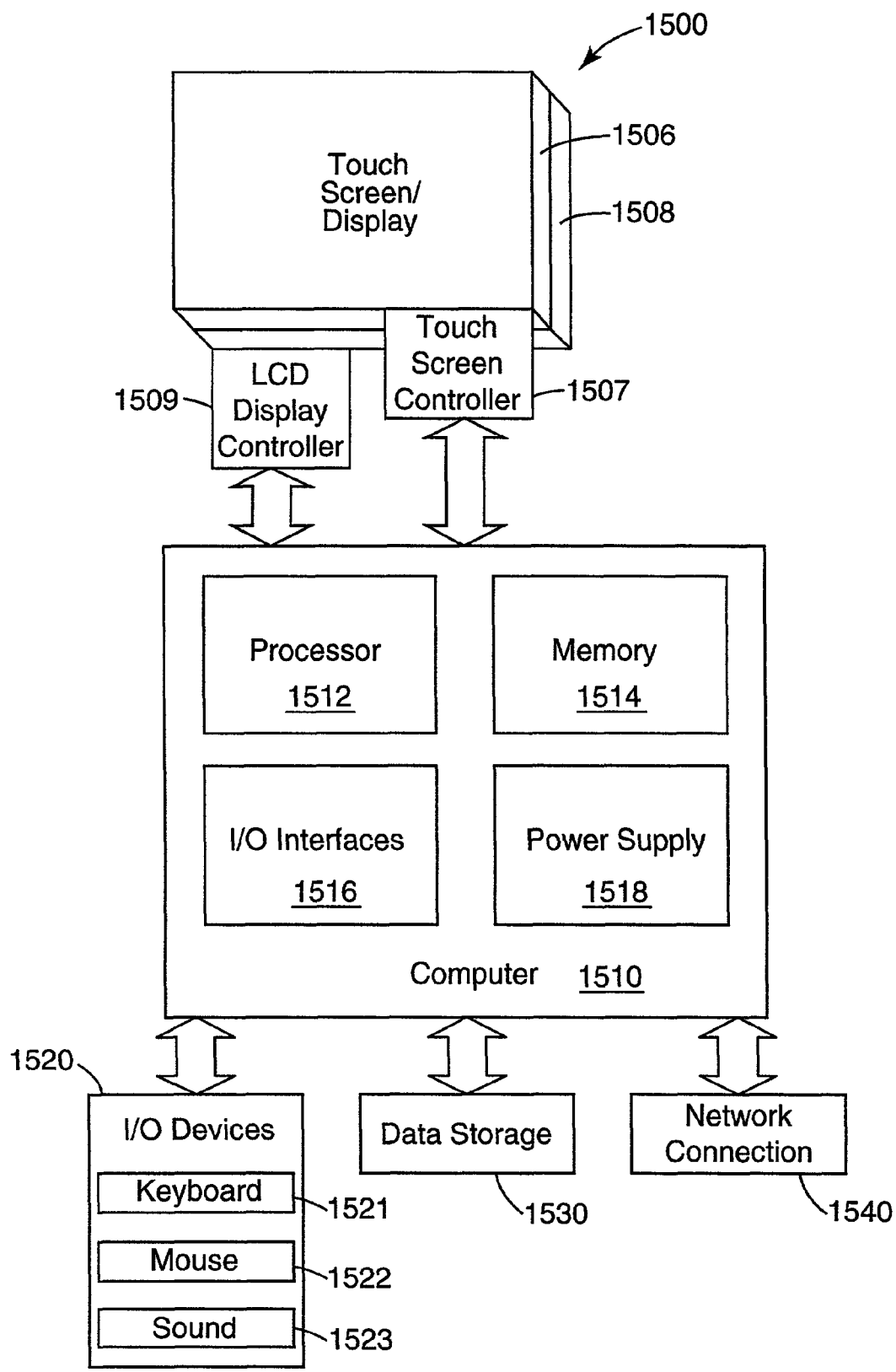
FIG. 15 is a block diagram of a data processing system using a touch sensing interface in accordance with an embodiment of the invention.

A touch screen system of the present invention may be advantageously implemented in various data processing systems. Turning now to FIG. 15, a block diagram of a data processing system 1500 using an integrated touch screen and display is shown in accordance with an embodiment of the present invention. The system 1500 uses a transparent touch screen 1506 arranged above a display 1508 suitable for data processing applications, such as an LCD display. Other displays may be used, such as a CRT display, plasma display, LED display, organic electroluminescent display, or the like. The display 1508 may require display control system circuitry 1509 for interfacing the display with the data processor computer 1510. A touch screen control system 1507 includes the drive/sense circuitry described above in addition to a touch screen control system processor according to an embodiment of the present invention. The touch screen control system 1507 is coupled to the data processor computer 1510 to provide touch information obtained in accordance with the methods of the invention.

The data processor 1510 may include various components depending upon the computer system application. For example, the data processor may include a microprocessor 1512, various types of memory circuitry 1514, a power supply 1518 and one or more input/output interfaces 1516. The input/output interfaces 1516 allow the data processing system to connect to any number of peripheral I/O devices 1520 such as keyboards 1521, pointing devices 1522, and sound devices 1523, including microphone and speakers. The data processing system may additionally include a mass data storage device 1530, for example, a hard disk drive or CD ROM drive, and may be networked to other data processing systems through a physical or wireless network connection 1540.

Figure 16:
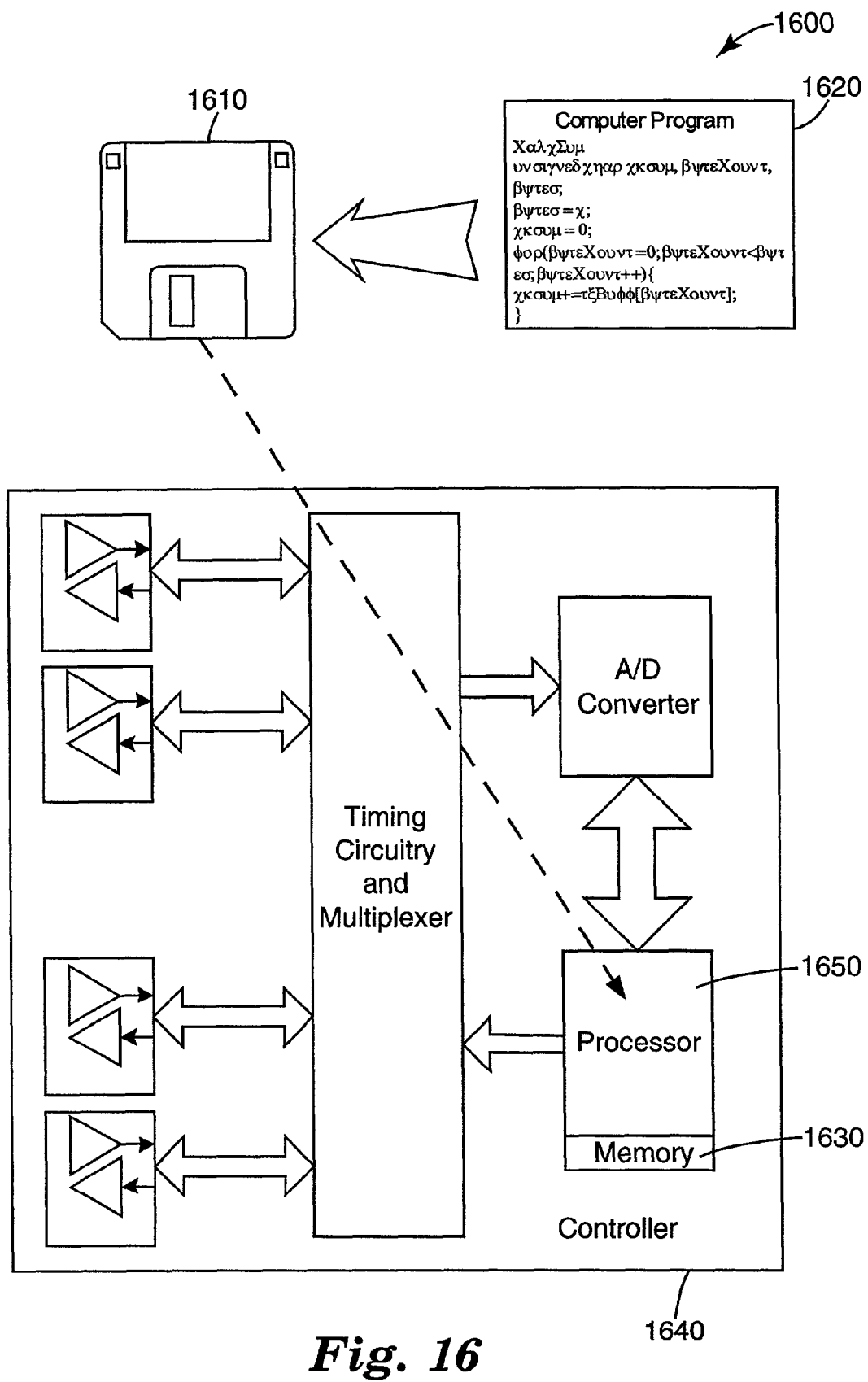
FIG. 16 illustrates a touch screen controller in accordance with an embodiment of the invention.

FIG. 16 illustrates a touch screen system 1600 in accordance with the present invention, wherein the processes illustrated with reference to FIGS. 1-15 may be tangibly embodied in a computer-readable medium or carrier, e.g. one or more of the fixed and/or removable data storage devices 1610 illustrated in FIG. 16, or other data storage or data communications devices. One or more computer programs 1620 expressing the processes embodied on the removable data storage devices 1610 may be loaded into various memory elements 1630 located within the touch screen control system 1640 to configure the touch screen system 1600 for operation in accordance with the invention. The computer programs 1620 comprise instructions which, when read and executed by the touch screen system processor 1650 of FIG. 16, cause the touch screen system 1600 to perform the steps necessary to execute the steps or elements for detecting the location of a touch on a touch screen in accordance with the principles of the present invention.

A touch sensing method and system in accordance with the principles of the present invention provides several advantages. For example, the touch location measurement can be performed at a time when the signal-to-noise ratio of the touch signal is high. The touch sensing approach described herein is well-suited for use with various data processing systems, including personal data assistants (PDAs), electronic instruments, cell phones, and computers, including handheld, laptop and desktop computers.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and processes.

What is claimed is:

1. A method for determining a touch location on a touch screen, comprising;
    acquiring a touch signal corresponding to a touch on the touch screen;
    detecting the first occurrence of a predetermined shape in the touch signal, the predetermined shape being associated with low signal error and based on a slope or a rate of change of the touch signal;
    determining touch location using touch signal information obtained in response to detecting the predetermined shape.

2. The method of claim 1, wherein acquiring the touch signal further comprises acquiring a signal indicative of a touch force.

3. The method of claim 1, wherein detecting the first occurrence of the predetermined shape comprises detecting a preferred time for obtaining touch signal information to determine touch location.

4. The method of claim 3, wherein detecting the preferred time comprises detecting a time when touch signal errors in the touch signal are minimal.

5. The method of claim 3, wherein detecting the preferred time comprises detecting a time when damping effect errors in the touch signal are minimal.

6. The method of claim 3, wherein detecting the preferred time comprises detecting a time when inertial effect errors in the touch signal are minimal.

7. The method of claim 1, wherein detecting the first occurrence of the predetermined shape comprises detecting a predetermined relative slope of the touch signal.

8. The method of claim 7, wherein detecting the predetermined relative slope comprises dividing a slope of the touch signal at a particular time by a magnitude of the touch signal at the particular time.

9. The method of claim 7, wherein detecting the first occurrence of the predetermined shape comprises detecting the first occurrence of the relative slope falling below a predetermined value.

10. The method of claim 7, wherein detecting the first occurrence of the predetermined shape comprises detecting the first occurrence that the relative slope changes sign.

11. The method of claim 7, wherein detecting the first occurrence of the predetermined shape comprises detecting the first occurrence of a touch signal point halfway through an interval of the touch signal for which the relative slope is less than a predetermined value.

12. The method of claim 8, wherein detecting the first occurrence of the predetermined shape comprises detecting the first occurrence of a touch signal point following a predetermined delay interval after the relative slope falls below a predetermined value.

13. The method of claim 1, wherein using a fixed threshold to determine that the touch signal represents a valid touch input further comprises determining that the touch signal exceeds a predetermined magnitude before detecting the first occurrence of a predetermined shape in the touch signal.

14. The method of claim 1, wherein using a fixed threshold to determine that the touch signal represents a valid touch input further comprises examining the touch signal to detect a rise of the touch signal above a predetermined magnitude after detecting the first occurrence of the predetermined shape in the touch signal.

15. The method of claim 3, further comprising obtaining touch location information if the preferred time is not detected after a predetermined interval and if the touch is deliberately slow.

16. The method of claim 3, further comprising masking a touch signal output until a current touch condition is removed if the preferred time is not detected after a predetermined interval and if the touch is not deliberately slow.

17. The method of claim 16, wherein the current touch condition is removed when the touch signal magnitude falls below a predetermined magnitude.

18. The method of claim 3, further comprising determining a series of touch locations after the preferred time is detected if the touch is a continuing touch.

19. The method of claim 18, wherein the further step of determining a series of touch locations after the preferred time is detected if the touch is a continuing touch comprises masking a touch location output when the relative slope falls below a predetermined range around zero.

20. The method of claim 18, further comprising reporting as a touch location output a first touch location in the series of touch locations until a predetermined time interval has elapsed.

21. The method of claim 18, further comprising reporting as a touch location output a first touch location in the series of touch locations until the touch location is calculated to be a predetermined distance from the first touch location.

22. A method for determining a touch location on a touch screen, comprising:
associating a predetermined touch signal shape with a low touch signal error and based on a slope or a rate of change of the touch signal;
acquiring a touch signal corresponding to a touch on the touch screen;
detecting the first occurrence of the predetermined touch signal shape in the touch signal; and
determining touch location using touch signal information obtained in response to detecting the predetermined touch signal shape.

23. The method of claim 22, wherein acquiring the touch signal corresponding to the touch on the touch screen further comprises acquiring a signal indicative of a touch force.

24. The method of claim 22, wherein detecting the first occurrence of a touch signal shape comprises detecting a predetermined relative slope of the touch signal.

25. The method of claim 22, wherein associating the touch signal shape with the level of touch signal error comprises associating the touch signal shape with a reduced level of touch signal error in comparison to a maximum touch signal error.

26. The method of claim 22, wherein associating the touch signal shape with the level of touch signal error comprises detecting a time when damping effect errors in the touch signal are minimal.

27. The method of claim 22, wherein associating the touch signal shape with the level of touch signal error comprises detecting a time when inertial effect errors in the touch signal are minimal.

28. The method of claim 21, wherein detecting the first occurrence of the touch signal shape comprises detecting a preferred time for obtaining touch signal information to determine touch location.

29. A method for determining a touch location on a touch screen, comprising;
associating a touch signal shape with a local minimum in touch-induced error;
acquiring a touch signal arising from a touch on the touch screen;
determining a particular time at which the touch signal shape is present in the touch signal by analyzing a slope or rate of change in the touch signal; and
determining touch location using touch signal information obtained at the particular time.

30. The method of claim 29, wherein the acquiring a touch signal arising from a touch comprises acquiring a signal indicative of a touch force.

31. The method of claim 29, wherein determining the particular time at which the touch signal shape is present in the touch signal comprises determining a preferred time for obtaining touch signal information to determine touch location.

32. The method of claim 29, wherein associating the touch signal shape with the local minimum in touch-induced error present in the touch signal comprises associating the touch signal shape to a time during the touch signal that damping effect errors are minimal.

33. The method of claim 29, wherein associating the touch signal shape with the local minimum in touch-induced error present in the touch signal comprises associating the touch signal shape to a time during the touch signal that inertial effect errors are minimal.

34. The method of claim 29, wherein associating the touch signal shape with the local minimum in touch-induced error present in the touch signal further comprises associating a predetermined relative slope of the touch signal with the local minimum in touch-induced error present in the touch signal.

35. A method for determining a touch location on a touch screen, comprising:
acquiring a touch signal indicative of a force due to a touch on the touch screen;
detecting a touch signal shape within an interval of the touch signal associated with maximum touch force, the touch signal shape being associated with low signal error and determined using slope or a rate of change of the touch signal; and
determining touch location using touch signal information obtained in response to detecting the touch signal shape.

36. The method of claim 35, wherein detecting the touch signal shape within the interval of the touch signal associated with maximum touch force comprises detecting the touch signal shape within an interval beginning with the application of a touch and ending when a slope of the touch signal falls below a predetermined value.

37. The method of claim 35, wherein detecting the touch signal shape within the interval of the touch signal associated with maximum touch force comprises detecting the touch signal shape within an interval beginning with the application of a touch and ending when a magnitude of the touch signal falls below a predetermined value.

38. The method of claim 35, wherein detecting a touch signal shape within the interval of the touch signal associated with maximum touch force comprises detecting a preferred time for obtaining touch signal information to determine touch location.

39. The method of claim 38, wherein detecting the preferred time comprises detecting a time when touch signal errors in the touch signal are minimal.

40. The method of claim 38, wherein detecting the preferred time comprises detecting a time when damping effect errors in the touch signal are minimal.

41. The method of claim 34, wherein detecting the preferred time comprises detecting a time when inertial effect errors in the touch signal are minimal.

42. The method of claim 35, wherein detecting the touch signal shape within the interval of the touch signal associated with maximum touch force comprises detecting a predetermined relative slope of the touch signal.

43. A method for determining touch location on a touch screen comprising;
acquiring a touch signal representative of a touch on the touch screen, the touch signal having an error related to the rate of change of the touch signal;
detecting a particular time for obtaining touch signal information for determining touch location based on a slope or the rate of change of the touch signal that relates to a low signal error; and
determining the touch location using touch signal information obtained at the particular time.

44. A touch screen system, comprising;
a touch surface;
a plurality of touch sensors, each of the touch sensors physically coupled to the touch surface and producing a sensor signal in response to a touch applied to the touch surface; and
a control system, coupled to the touch sensors and receiving the sensor signals, the control system acquiring a touch signal corresponding to a touch on the touch screen, detecting a first occurrence of a touch signal shape in the touch signal, the touch signal shape being associated with low signal error and based on a slope or a rate of change of the touch signal; and determining touch location using touch signal information obtained in response to detecting the touch signal shape.

45. The system of claim 44, wherein the touch sensors comprise force sensors.

46. The system of claim 44, wherein the touch sensors comprise capacitive force sensors.

47. The system of claim 44, wherein the touch surface is substantially rectangular with one of the plurality of touch sensors located at each corner of the touch screen.

48. The system of claim 47, wherein each touch sensor produces a sensor signal indicative of a force of a touch sensed at a location of the touch sensor.

49. The system of claim 44, wherein the control system derives one or more touch signals by combining one or more sensor signals.

50. The system of claim 44, wherein the control system comprises a filter for filtering touch signals produced by the touch sensors.

51. The system of claim 50, wherein the filter comprises a digital filter.

52. The system of claim 51, wherein the digital filter comprises a finite impulse response filter or an infinite impulse filter.

53. The system of claim 44, wherein the touch signal shape used to determine the touch location comprises a slope of the touch signal calculated by the processor.

54. The system of claim 44, wherein the processor calculates a relative slope of the touch signal as the slope of the touch signal at a particular time divided by a magnitude of the touch signal at the particular time.

55. A touch screen display system, comprising;
a force sensitive touch screen system including a touch surface and a plurality of touch sensors, each of the touch sensors physically coupled to the touch surface and producing a touch signal in response to a touch force applied from a touch to the touch surface;
a control system coupled to the touch sensors and receiving the sensor signals, the control system detecting a first occurrence of a touch signal shape in the touch signal by at least using a slope or a rate of change of the touch signal, the touch signal shape being associated with low signal error; and determining touch location using touch signal information a display for displaying information through the touch screen system.

56. The system of claim 55, wherein the display is a liquid crystal display, a light emitting diode display, a plasma display, an organic electroluminescent display, or a cathode ray tube display.

57. The system of claim 55, wherein the touch sensors comprise force sensors.

58. The system of claim 55, wherein each touch sensor produces a sensor signal indicative of a force of a touch sensed at a location of the touch sensor.

59. The system of claim 55, wherein the control system derives one or more touch signals by combining one or more sensor signals.

60. A display system, comprising:
a force sensitive touch screen system including a touch surface and a plurality of touch sensors, each of the touch sensors physically coupled to the touch surface and producing a touch signal in response to a touch force applied from a touch to the touch surface;
a control system, coupled to the touch sensors and receiving the sensor signals, the control system detecting a first occurrence of a touch signal shape in the touch signal, the touch signal shape being associated with low signal error and determined with reference to a slope of rate of change of the touch signal; and determining touch location using touch signal information obtained in response to detecting the touch signal shape;

a display for displaying information; and a processor coupled to the display and the touch screen system for processing data to be displayed on the display and information received from the touch screen system.

61. The system of claim 60, wherein the display displays information through the touch screen.

62. The system of claim 60, wherein the display is a liquid crystal display, a light emitting diode display, a plasma display, an organic electroluminescent display, or a cathode ray tube display.

63. The system of claim 60, wherein the processor receives information regarding a touch made on the touch screen relative to information displayed on the display.

64. The system of claim 60, wherein the touch sensors comprise force sensors.

65. The system of claim 60, wherein each touch sensor produces a sensor signal indicative of a force of a touch sensed at a location of the touch sensor.

66. The system of claim 60, wherein the control system derives one or more touch signals by combining one or more sensor signals.

67. The system of claim 60, further comprising:

one or more data storage devices coupled to the processor for storing data;

one or more input devices for transferring information to the processor; and one or more output devices for transferring information from the processor.

68. The system of claim 60, further comprising one or more interfaces for coupling the system to one or more networks.

69. A system for determining the location of a touch on a touch screen, comprising:

means for acquiring a touch signal indicative of a force due to a touch on the touch screen;

means for detecting a first occurrence of a predetermined shape in the touch signal, the predetermined shape being associated with low signal error and detected with reference to a slope or rate of change of the touch signal; and means for determining touch location using touch signal information obtained in response to detecting the predetermined touch signal shape.

70. The method of claim 69, wherein means for acquiring the touch signal further comprises means for acquiring a signal indicative of a touch force.

71. The method of claim 69, wherein means for detecting the first occurrence of the touch signal shape comprises means for detecting a preferred time for obtaining touch signal information to determine touch location.

72. The method of claim 71, wherein means for detecting the preferred time comprises means for detecting a time when touch signal errors in the touch signal are minimal.

73. The method of claim 69, wherein means for detecting the first occurrence of the touch signal shape comprises means for detecting a predetermined relative slope of the touch signal.

74. A system for determining the location of a touch on a touch screen, comprising:

means for associating a predetermined touch signal shape with a low level of touch signal error and detected with reference to a slope or rate of change of the touch signal;

means for acquiring a touch signal corresponding to a touch on the touch screen;

means for detecting a first occurrence of the predetermined signal shape in the touch signal; and means for determining touch location using touch signal information obtained in response to detecting the predetermined touch signal shape.

75. A system for determining a touch location on a touch screen, comprising:

means for acquiring a touch signal indicative of a force due to a touch on the touch screen;

means for detecting a touch signal shape within an interval of the touch signal associated with maximum touch force, the touch signal shape associated with low signal error and detected with reference to a slope or rate of change of the touch signal; and means for determining touch location using touch signal information obtained in response to detecting the touch signal shape.

76. A non transient computer readable medium configured with executable instructions for causing one or more computers to perform a method of determining the location of a touch on a touch screen, the method comprising:

acquiring a touch signal indicative of a force due to a touch on the touch screen;

detecting a first occurrence of a predetermined shape in the touch signal, the predetermined shape associated with low signal error and calculated with reference to a slope or a rate of change of the touch signal; and determining touch location using touch signal information obtained in response to detecting the touch signal shape.

* * * * *

UNITED STATES PATENT AND TRADEMARK OFFICE
CERTIFICATE OF CORRECTION

| | | |
|---|---|---|
| PATENT NO. | : 7,746,325 B2 | Page 1 of 1 |
| APPLICATION NO. | : 10/140209 | |
| DATED | : June 29, 2010 | |
| INVENTOR(S) | : Jerry Roberts | |

It is certified that error appears in the above-identified patent and that said Letters Patent is hereby corrected as shown below:

Title Page
Item [56], References Cited, OTHER PUBLICATIONS, Page 2, Column 2
Line 7, delete "Tagential" and insert -- Tangential -- therefor.

Signed and Sealed this

Twenty-third Day of November, 2010

David J. Kappos
*Director of the United States Patent and Trademark Office*